United States Patent
Shinya

(10) Patent No.: US 11,496,645 B2
(45) Date of Patent: Nov. 8, 2022

(54) IMAGE FORMING SYSTEM, IMAGE FORMING APPARATUS, CONTROL METHOD, AND STORAGE MEDIUM

(71) Applicant: CANON KABUSHIKI KAISHA, Tokyo (JP)

(72) Inventor: Takeshi Shinya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/365,816

(22) Filed: Jul. 1, 2021

(65) Prior Publication Data

US 2022/0014646 A1 Jan. 13, 2022

(30) Foreign Application Priority Data

Jul. 10, 2020 (JP) .............................. JP2020-119402

(51) Int. Cl.
*H04N 1/04* (2006.01)
*H04N 1/387* (2006.01)
*H04N 1/00* (2006.01)

(52) U.S. Cl.
CPC ....... *H04N 1/3878* (2013.01); *H04N 1/00413* (2013.01); *H04N 1/00702* (2013.01); *H04N 1/00708* (2013.01); *H04N 1/00748* (2013.01)

(58) Field of Classification Search
CPC ............. H04N 1/3878; H04N 1/00413; H04N 1/00702; H04N 1/00708; H04N 1/00748
USPC ............................................ 358/3.26, 1.12
See application file for complete search history.

(56) References Cited

U.S. PATENT DOCUMENTS

2017/0253023 A1* 9/2017 Nishikawa ............. B41J 2/2142

FOREIGN PATENT DOCUMENTS

| JP | 2008281950 A | 11/2008 |
| JP | 2015143018 A | 8/2015 |
| JP | 2016111628 A | 6/2016 |
| JP | 2018072538 A | 5/2018 |

\* cited by examiner

*Primary Examiner* — Cheukfan Lee
(74) *Attorney, Agent, or Firm* — Canon U.S.A., Inc. I.P. Division

(57) ABSTRACT

An image forming apparatus includes an image forming device that forms an image on a sheet and an image reading device that conveys a document placed on a stacking portion and reads an image on the document. The image forming device outputs first and second output materials in succession. First output material constitutes a first type of sheet having a predetermined pattern image, and the second output material constitutes a second type of sheet having the predetermined pattern image. The image reading device conveys the first and second output materials in succession from the stacking portion and reads a first image and a second image. A first parameter to cause image formation using the sheet of the first type is acquired based on the first image and a second parameter to cause image formation using the sheet of the second type is acquired based on the second image.

13 Claims, 22 Drawing Sheets

FIG.3

| CASSETTE STAGE 311 | SHEET NAME 312 | SUB-SCANNING DIRECTION SHEET LENGTH (mm) 313 | MAIN SCANNING DIRECTION SHEET LENGTH (mm) 314 | GRAMMAGE (g/m²) 315 | SURFACE PROPERTY 316 | COLOR 317 |
|---|---|---|---|---|---|---|
| CASSETTE 1 | ABC RECYCLED PAPER 1 | 210 | 297 | 75 | PLAIN PAPER | WHITE |
| CASSETTE 2 | ABC RECYCLED PAPER 2 | 297 | 420 | 75 | PLAIN PAPER | WHITE |
| CASSETTE 3 | DEF EMBOSSED PAPER A-1 | 216 | 279 | 150 | EMBOSSED | WHITE |
| CASSETTE 4 | DEF COLORED PAPER B1 | 210 | 297 | 75 | PLAIN PAPER | ORANGE |
| CASSETTE 5 | XYZ COATED PAPER P-1 | 297 | 210 | 75 | DOUBLE SIDE COATED | WHITE |

EDIT 320  PRINT POSITION ADJUSTMENT 321

FIG.4

CASSETTE 4 SHEET ATTRIBUTE EDITING

| | | |
|---|---|---|
| SHEET NAME | DEF COLORED PAPER 81 | 401 |
| SUB-SCANNING DIRECTION SHEET LENGTH (mm) | 210 | 402 |
| MAIN SCANNING DIRECTION SHEET LENGTH (mm) | 297 | 403 |
| GRAMMAGE (g/m$^2$) | 75 | 404 |
| SURFACE PROPERTY | PLAIN PAPER ▼ | 405 |
| COLOR | ORANGE ▼ | 406 |

EDITING END — 407    BACK — 408

| CASSETTE STAGE ~511 | SHEET NAME ~512 | SUB-SCANNING DIRECTION SHEET LENGTH [mm] ~513 | MAIN SCANNING DIRECTION SHEET LENGTH [mm] ~514 | GRAMMAGE (g/m²) ~515 | SURFACE PROPERTY ~516 | COLOR ~517 | PRINT POSITION MISALIGNMENT AMOUNT (FRONT SURFACE) ~520 | PRINT POSITION MISALIGNMENT AMOUNT (BACK SURFACE) ~521 |
|---|---|---|---|---|---|---|---|---|
| CASSETTE 1 (501) | ABC RECYCLED PAPER 1 | 210 | 297 | 75 | PLAIN PAPER | WHITE | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% | LEADING POSITION: 0.2 mm<br>SIDE POSITION: 0.1 mm<br>MAIN SCANNING MAGNIFICATION: 0.02%<br>SUB-SCANNING MAGNIFICATION: -0.03% |
| CASSETTE 2 (502) | ABC RECYCLED PAPER 2 | 297 | 420 | 75 | PLAIN PAPER | WHITE | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% |
| CASSETTE 3 (503) | DEF EMBOSSED PAPER A-1 | 216 | 279 | 150 | EMBOSSED | WHITE | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% |
| CASSETTE 4 (504) | DEF COLORED PAPER 81 | 210 | 297 | 75 | PLAIN PAPER | ORANGE | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% |
| CASSETTE 5 (505) | XYZ COATED PAPER P-1 | 297 | 210 | 75 | DOUBLE SIDE COATED | WHITE | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% | LEADING POSITION: 0.3 mm<br>SIDE POSITION: -0.1 mm<br>MAIN SCANNING MAGNIFICATION: 0.02%<br>SUB-SCANNING MAGNIFICATION: 0.01% |

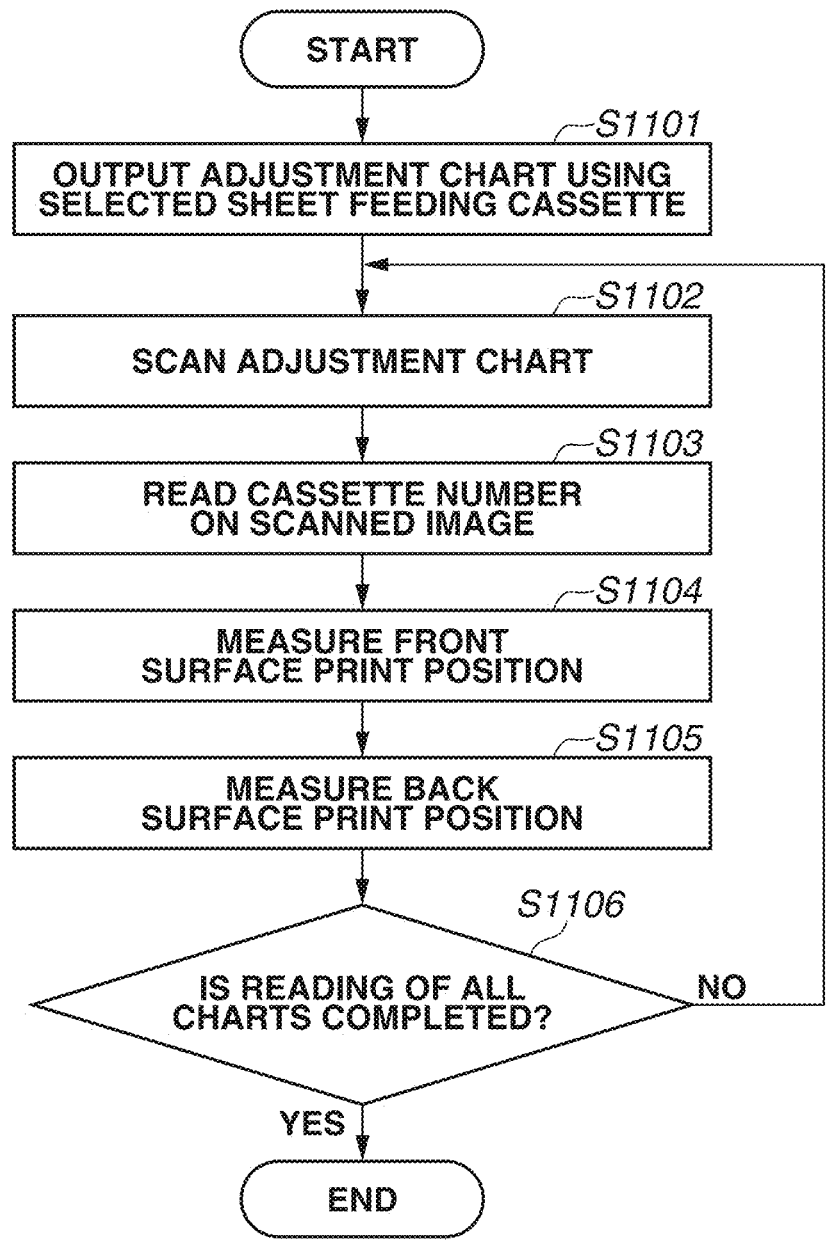

IMAGE FORMING SYSTEM, IMAGE FORMING APPARATUS, CONTROL METHOD, AND STORAGE MEDIUM

BACKGROUND

Field

The present disclosure relates to an image forming system that performs processing of adjusting an image forming position on a sheet. An image forming apparatus used for the image forming system is applicable to various apparatuses, including a copying machine, a printer, a facsimile (FAX), and a multi-function peripheral including these functions.

Description of the Related Art

Printing apparatuses (image processing apparatus) that forms images on sheets use the function of adjusting an image forming position on a sheet (this function is hereinafter referred to as "print position adjustment"). Japanese Patent Application Laid-Open No. 2016-111628 discusses a technique of printing adjustment marks on a sheet and reading them on a reading apparatus to obtain the positional relationship between each mark and the corresponding side of the sheet to acquire parameters for print position adjustment. Japanese Patent Application Laid-Open No. 2016-111628 also discusses an automatic document feeding apparatus, which is called an auto document feeder (ADF), as an example of the reading apparatus. The parameters for print position adjustment vary depending on the cut shape of each cut sheet. As a result, the operation of acquiring parameters for print position adjustment is carried out for each sheet type.

The configuration in which a sheet with adjustment marks thereon is set on the ADF that reads the image on the sheet to acquire adjustment values as discussed in Japanese Patent Application Laid-Open No. 2016-111628 has room for improvement in terms of operability. If the print adjustment values for various types of sheet are acquired with this configuration, the operation of setting a sheet with adjustment marks thereon to be read by the ADF will be repeated for each type of sheet.

SUMMARY

The present disclosure is directed to providing an image forming system with excellent operability in reading various types of sheet to acquire parameters.

According to an aspect of the present disclosure, an image forming apparatus includes an image forming device configured to form an image on a sheet, an image reading device configured to convey a document placed on a stacking portion and read an image on the document, and one or more controllers configured to perform operations including causing the image forming device to execute output processing to output a first output material and a second output material in succession, wherein the first output material constitutes a sheet of a first type on which an image of a predetermined pattern is formed, and the second output material constitutes a sheet of a second type on which the image of the predetermined pattern is formed, causing the image reading device to execute reading processing of conveying the first output material and the second output material in succession from the stacking portion and reading a first image and a second image, and acquiring a first parameter based on the first image and a second parameter based on the second image, wherein the first parameter is a parameter for use in causing the image forming device to execute image formation using the sheet of the first type, and the second parameter is a parameter for use in causing the image forming device to execute image formation using the sheet of the second type.

Further features of the present disclosure will become apparent from the following description of exemplary embodiments with reference to the attached drawings.

BRIEF DESCRIPTION OF THE DRAWINGS

FIG. 3 illustrates a cassette library on a screen.
FIG. 4 illustrates a sheet attribute editing screen.
FIG. 5 illustrates management data on the cassette library.
FIG. 11 is a flowchart illustrating print position adjustment processing according to the first exemplary embodiment.

DESCRIPTION OF THE EMBODIMENTS

Some exemplary embodiments for carrying out the present disclosure will be described below with reference to the drawings. The following exemplary embodiments are not intended to limit the disclosure described in the scope of the claims, and not all the combinations of features described in the exemplary embodiments are used to the solution in the disclosure.

<Image Forming System>

Figure 1:
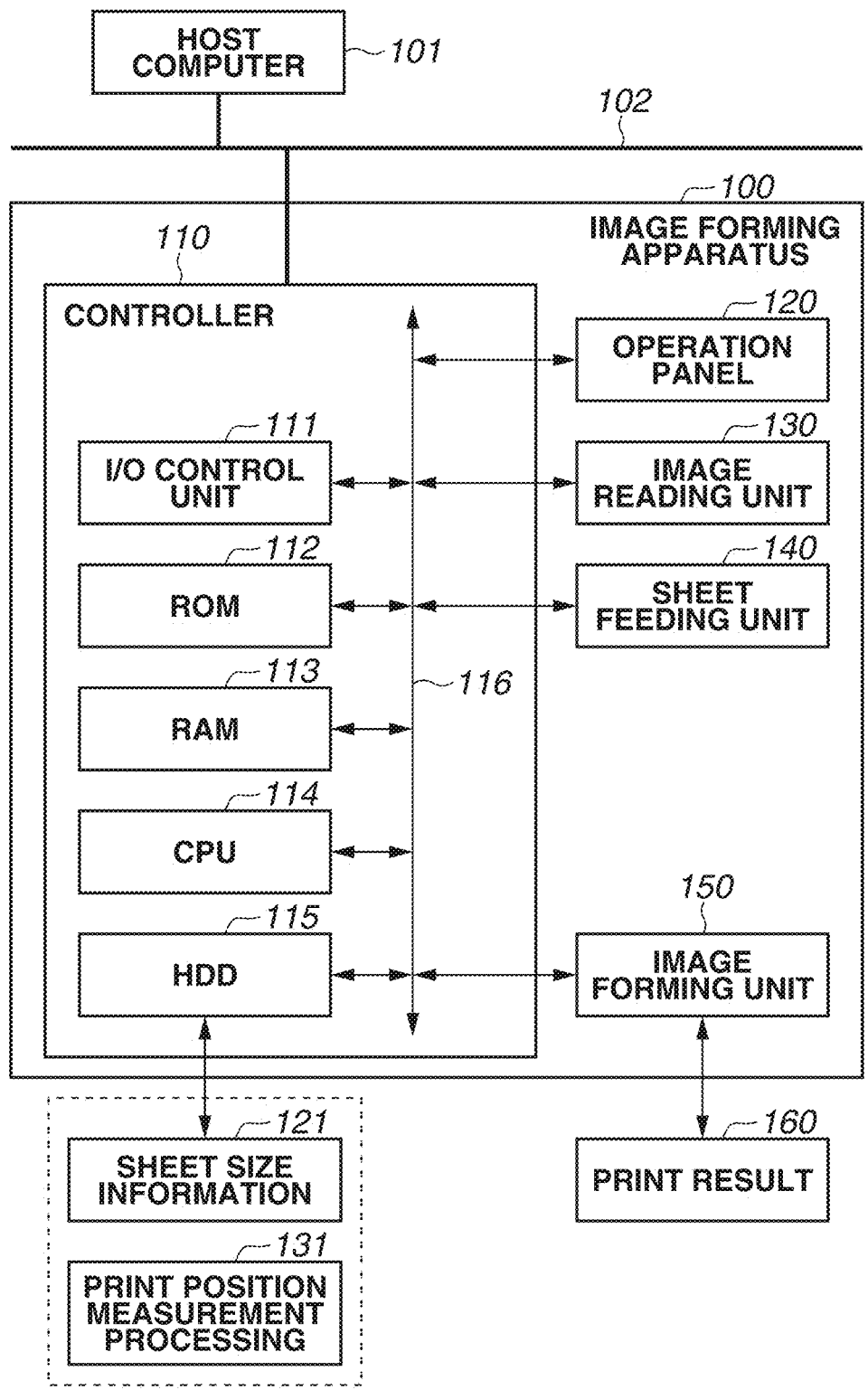
FIG. 1 is a block diagram illustrating a configuration of an image forming system.

FIG. 1 is a block diagram illustrating a configuration of an image forming system (printing system) according to an exemplary embodiment of the present disclosure. As illustrated in FIG. 1, the printing system according to the present exemplary embodiment includes an image forming apparatus 100 and a host computer 101. The image forming apparatus 100 and the host computer 101 are connected to each other via a communications line 102. In some embodiments, a plurality of host computers and a plurality of image forming apparatuses are connected to each other.

The host computer 101 acquires information input by an operator via an input device (not illustrated), creates a print job to be transmitted to the image forming apparatus 100, and transmits the created print job to the image forming apparatus 100. A controller 110 performs various types of data processing to control the operation of the image forming apparatus 100. An operation panel 120 is a display unit that displays information and also serves as a reception unit that receives various types of operation from the operator via its touch panel. Sheet size information 121 includes the size of print sheets and the amount of position adjustment acquired from a cassette library via the operation panel 120 as described below. An image reading unit 130 is a reading device that scans documents with an optical sensor and acquires scanned image data. Print position measurement processing 131 is processing of acquiring relative coordinates of the print position on the read image on a print position adjustment chart that has been printed, as described below. A sheet feeding unit 140 is a sheet feeding apparatus (sheet storage unit) including a plurality of sheet feeding cassettes (140-1, 140-2, 140-3, 140-4, and 140-5). Each sheet feeding cassette accommodates various types of print sheet. Each sheet feeding cassette is configured to separate the top sheet from the accommodated sheets and convey the sheet to an image forming unit 150. The image forming unit 150 is an image forming device that physically prints image data on print sheets. A print result 160 is a result printed by the image forming unit 150.

Next, the configuration of the controller 110 will be described. An input/output (I/O) control unit 111 controls communications with an external network. A read-only memory (ROM) 112 is a ROM for storing various types of control program. A random-access memory (RAM) 113 is a RAM to store control programs loaded from the ROM 112. A central processing unit (CPU) 114 runs control programs loaded in the RAM 113 to control image signals and various types of device in an integrated manner. A hard disk drive (HDD) 115 is an HDD used to hold large-capacity data such as image data and print data temporarily or for a long period of time. The modules are connected to each other via a system bus 116. The system bus 116 connects the controller 110 to each device in the image forming apparatus 100. The RAM 113 also functions as a main memory and a work memory for the CPU 114. Control programs and an operating system are stored in the HDD 115, as well as in the ROM 112. In one or more embodiments, a non-volatile (NV) RAM is provided to store image forming apparatus mode setting information from the operation panel 120.

<Image Forming Apparatus>

Figure 2:
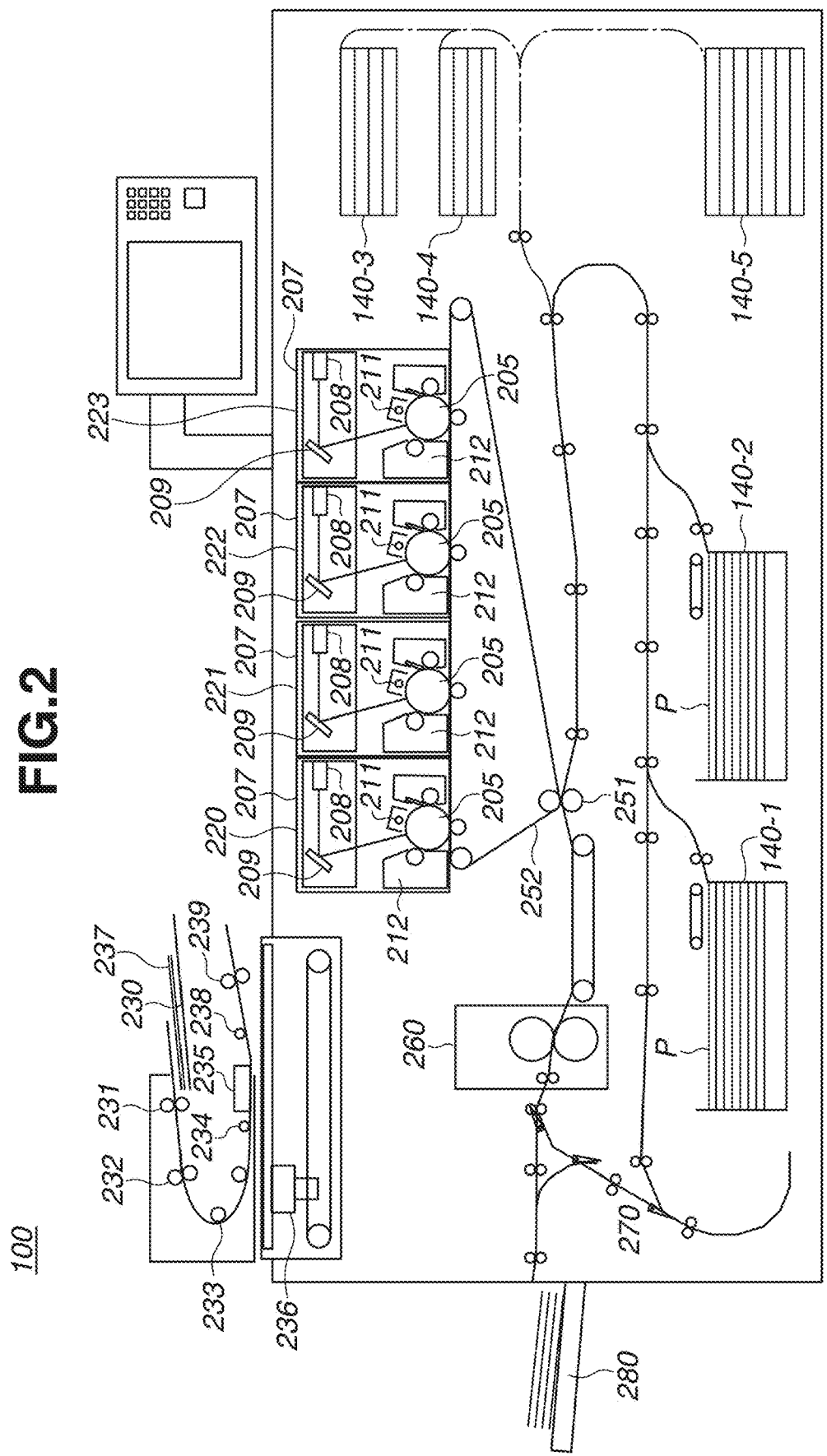
FIG. 2 is a sectional view illustrating a configuration of an image forming apparatus.

The image forming apparatus 100 will be described. FIG. 2 is a sectional view illustrating the configuration of the image forming apparatus 100 according to the present exemplary embodiment. As illustrated in FIG. 2, the image forming apparatus 100 includes a housing. The housing includes mechanisms that constitute an engine unit, and an engine control unit that controls print processing (e.g., sheet feed processing) performed by each mechanism. The housing also includes a control board accommodation unit that accommodates a printer controller.

The mechanisms constituting the engine unit function to form an electrostatic latent image on the surface of each photosensitive drum 205 by scanning with laser light, visualize the electrostatic latent image, and transfer the visualized image in multiple layers on the surface of an intermediate transfer member 252. The image forming apparatus 100 also includes an optical processing mechanism for further transferring a color image transferred in multiple layers onto a sheet P, a fixation processing mechanism for fixing the toner image onto the sheet P, a sheet feed processing mechanism for feeding the sheet P, and a conveyance processing mechanism for conveying the sheet P.

The optical processing mechanism includes a laser driver that turns laser light emitted from a semiconductor laser (not illustrated) on or off according to image data supplied from a printer controller in each laser scanner unit 207. Laser light emitted from the semiconductor laser is reflected by a rotary polygon mirror 208 in the scanning direction, which is the main scanning direction. The laser light reflected in the main scanning direction is guided via the corresponding reflection polygon mirror 209 to the corresponding photosensitive drum 205, exposing the surface of the photosensitive drum 205 in the main scanning direction. On the other hand, a primary charger 211 charges the corresponding photosensitive drum 205, and the laser light forms an electrostatic image on the surface of the photosensitive drum 205. Then, the electrostatic image is visualized into a toner image with toner supplied from the corresponding developing device 212, which will be described below. The visualized toner image on the surface of each photosensitive drum 205 is transferred (primarily transferred) onto the surface of the intermediate transfer member 252 with a voltage having a polarity opposite to that of the toner image applied. During the color image formation, each color image is formed at a yellow (Y) station 220, a magenta (M) station 221, a cyan (C) station 222, and a black (K) station 223 sequentially on the surface of the intermediate transfer member 252, forming a full-color visible image on the surface of the intermediate transfer member 252.

Next, the sheet P fed from any cassette of the sheet feeding unit 140 (140-1, 140-2, 140-3, 140-4, and 140-5) is conveyed. A transfer roller 251 brings the sheet P into pressure contact with the intermediate transfer member 252, and a bias having a polarity opposite to that of the toner is applied to the transfer roller 251, thereby forming a visible image on the surface of the intermediate transfer member 252. This visible image is transferred onto the sheet P conveyed in synchronization in the conveyance direction (sub-scanning direction) of the sheet P by the sheet feed processing mechanism (secondary transfer).

After the secondary transfer, the transferred toner on the sheet P is heated, fused, and fixed on the sheet P while the sheet P passes through a fixing device 260. In duplex printing, the sheet P is switched back after passing through a reversing unit 270, and again is conveyed into a transfer unit between the transfer roller 251 and the intermediate transfer member 252, at which an image is transferred on the back surface of the sheet P. After that, while the sheet P passes through the fixing device 260 in the same manner as described above, the toner image on the back surface of the sheet P is heated to be fixed on the sheet P. The sheet P is discharged onto a sheet discharge unit 280, completing the print process. A plurality of sheets P is stackable on the sheet discharge unit 280.

<Image Reading Unit>

The image reading unit 130 includes a document plate 230, a pickup roller 231, a conveyance roller 232, a roller 233, a light source 234, a second reading unit 235, a discharge roller 238, a reading unit 236, and documents 237. Each of the documents 237 placed on the document plate 230 is fed one by one by the pickup roller 231, and conveyed through the conveyance roller 232 along a reading path. The sheet of the documents 237 reaches one reading position through the path, and image information on the front surface of the sheet of the documents 237 is read with the light source 234 and by the reading unit 236. After that, when the sheet of the documents 237 reaches the other reading position at the reading unit 235, image information on the back surface of the sheet of the documents 237 is read by the second reading unit 235. The second reading unit 235 is, for example, a contact image sensor (CIS). After that, the sheet of the documents 237 is discharged by discharge rollers 239.

The pieces of image information on the front surface and the back surface of each of the documents placed on the document plate 230 are read in one conveyance process by the repeated above-described operation.

While the present exemplary embodiment illustrates an example where both surfaces of one sheet of the documents are read in one conveyance process as a suitable example, the present disclosure is not limited to this example as long as both surfaces of a sheet are read. In one or more embodiments, a reading apparatus including a reverse conveyance mechanism is used.

<Cassette Library>

The sheets used for printing in the image forming apparatus 100 are managed by the operator using a database called a cassette library. The cassette library is stored in the HDD 115 or the RAM 113, and is read or written by each software module as appropriate. The configuration of the cassette library will be described in detail below with reference to FIG. 5.

FIG. 3 illustrates an interface screen used for the operator to perform operation such as editing on the cassette library in the printing system according to the present exemplary embodiment. A screen 300 represents the whole interface screen displayed on the operation panel 120 by the CPU 114.

A cassette list 310 lists various types of sheet stored in each sheet feeding cassette of the sheet feeding unit 140. The cassette list 310 shows the operator sheet attributes indicated by columns 311 to 317 as additional information on each sheet feeding cassette of the sheet feeding unit 140. The column 311 indicates the number of each sheet feeding cassette. Each sheet feeding cassette number indicates the corresponding sheet feeding cassette of the sheet feeding unit 140 in the image forming apparatus 100. The column 312 indicates the name of each type of sheet placed in each sheet feeding cassette of the sheet feeding unit 140. The sheet name is a name (identification information) designated by the operator or the like for each type of sheet to be distinguished from one another. The column 313 indicates the sheet length in the sub-scanning direction, of the sheets placed in each sheet feeding cassette of the sheet feeding unit 140, and the column 314 indicates the sheet length in the main scanning direction, of the sheets placed in each sheet feeding cassette of the sheet feeding unit 140. The term "sub-scanning direction" used herein refers to a sheet conveyance direction. The term "main scanning direction" used herein refers to a direction perpendicular to the sub-scanning direction. The column 315 indicates the grammage of the sheets placed in each sheet feeding cassette of the sheet feeding unit 140. The column 316 indicates the surface property of the sheets placed in each sheet feeding cassette of the sheet feeding unit 140. The surface property is an attribute representing a physical property of the surface of the sheets. Examples of the surface property include "coated" on the surface to increase glossiness, and "embossed" on the surface with irregularities. The column 317 indicates the color of the sheets (the color of the sheets itself) placed in each sheet feeding cassette of the sheet feeding unit 140. Any sheet feeding cassette of the sheet feeding unit 140 in the cassette list 310 is selectable by the operator touching the location displaying the sheet feeding cassette in the cassette list 310 on the operation panel 120. The selected one sheet feeding cassette of the sheet feeding unit 140 is highlighted. FIG. 3 illustrates a state where, for example, "DEF colored paper 81" is selected. If the number of sheet feeding cassettes of the sheet feeding unit 140 recorded on the cassette library is larger than the maximum number of sheet feeding cassettes of the sheet feeding unit 140 displayed at a time in the cassette list 310, a scroll bar 318 is used. The operation of the scroll bar 318 by the operator allows any sheet feeding cassette of the sheet feeding unit 140 to be selected.

An edit button 320 is a button for editing sheet attributes corresponding to the selected sheet feeding cassette of the sheet feeding unit 140 in the cassette list 310. Pressing the edit button 320 causes the interface screen illustrated in FIG. 4 to be displayed. A print position adjustment button 321 is a button for executing print position adjustment, which will be described below.

<Cassette Library Editing Interface>

FIG. 4 illustrates an interface screen used for the operator to edit sheet attributes corresponding to the selected sheet feeding cassette of the sheet feeding unit 140 in the printing system according to the present exemplary embodiment. A screen 400 represents the whole interface screen displayed on the operation panel 120 by the CPU 114, and includes text boxes 401 to 404.

The text boxes 401 to 404 are used to input sheet attributes, i.e., sheet name, sub-scanning direction sheet length, main scanning direction sheet length, and grammage, respectively. Sheet attributes are input to corresponding text boxes using, for example, a software keyboard (not illustrated) or a numeric keypad included in the operation panel 120.

Combo boxes 405 and 406 are used to designate the surface property and color of the sheets, respectively. The combo boxes allow the designation of one of the surface properties in a surface property list and one of the colors in a color list, the surface properties and colors of which have been registered and are supportable by the image forming apparatus 100.

By pressing an editing end button 407, the operator confirms the sheet attribute input entered then, the sheet attributes being stored in the cassette library. After that, the interface screen 400 is closed and the screen returns to the cassette library editing screen 300. In response to a press of a back button 408, the sheet attribute editing processing is stopped and the interface screen 400 is closed. Then, the screen returns to the cassette library editing screen 300.

<Details of Cassette Library>

FIG. 5 illustrates a cassette library stored in the HDD 115 or another memory in a schematic table. In the present exemplary embodiment, the cassette library is illustrated in a schematic table for better explanation. However, in practice, the cassette library is stored in a digital information form such as Extensible Markup Language (XML) or Comma-Separated Values (CSV).

Each of the pieces of cassette information 501 to 505 indicates the corresponding sheet feeding cassette of the sheet feeding unit 140 registered in the cassette library. A column 511 indicates the number of each sheet feeding cassette. Columns 512 to 517 indicate sheet attributes designated by the operator for the corresponding sheet feeding cassette of the sheet feeding unit 140 in the column 511. The column 512 indicates sheet names. The columns 513 to 517 indicate sheet attributes indicating physical properties of sheets. The column 513 indicates sub-scanning direction sheet length. The column 514 indicates main scanning direction sheet length. The column 515 indicates grammage. The column 516 indicates surface property. The column 517 indicates color.

Columns 520 and 521 indicate a print position misalignment amount on the front surfaces and a print position misalignment amount on the back surfaces of the sheets placed in each sheet feeding cassette of the sheet feeding unit 140, respectively. The term "print position misalignment amount" used herein refers to the amount of position misalignment with respect to an ideal print position. In the present exemplary embodiment, print position misalignment amount items are leading position, side position, main scanning magnification, and sub-scanning magnification. In actual printing, the image forming apparatus 100 performs adjustment processing to perform printing at an ideal print position based on the print position misalignment amounts (i.e., adjustment processing to reduce the print position misalignment amounts) and then performs printing. Leading position and side position mean a print position misalignment amount in the sub-scanning direction and a print position misalignment amount in the main scanning direction, respectively, for the sheets in each cassette. To adjust a leading position, the print start position of an image to be printed from the leading edge of a corresponding sheet in the conveyance direction is changed. To adjust a side position, the print start position of an image to be printed from the left edge of a corresponding sheet in the conveyance direction is changed. Sub-scanning direction magnification means a misalignment in the length of an image in the sub-scanning direction (magnification with respect to an ideal length). Main scanning direction magnification means a misalignment in the length of an image in the main scanning direction (magnification with respect to an ideal length). The degree of skew means the degree of parallelization to any side of a rectangular sheet. The degree of trapezoid means the degree of parallelization at the leading edge and trailing edge of an image printed on a sheet. Squareness means the rectangular degree of an image printed on a sheet.

These print position misalignment amounts are calculated through the detection of predetermined mark positions on a printed adjustment chart (a predetermined pattern image). An example of the adjustment chart will be described with reference to FIG. 6. The initial value of each print position misalignment amount is "0". The initial value is used, for example, if sheet information is newly registered on the cassette library, or if the print position adjustment has never carried out on a registered set of sheets placed in a sheet feeding cassette.

<Print Position Adjustment>

Figure 12A:
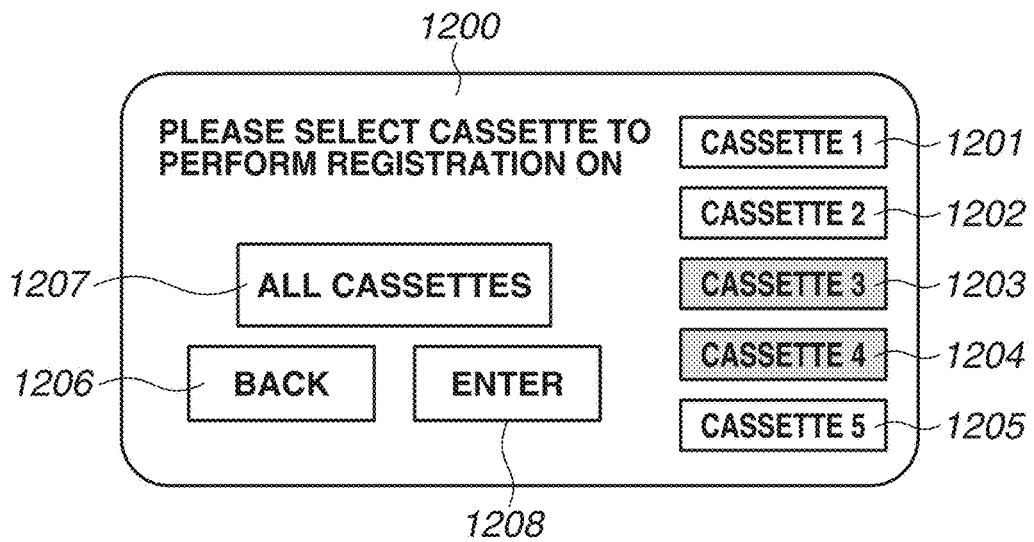
FIGS. 12A to 12C each illustrate a print position adjustment instruction screen.

In response to a press of the print position adjustment button 321, the CPU 114 displays a print position adjustment screen 1200 illustrated in FIG. 12A on the operation panel 120. The print position adjustment screen 1200 schematically represents an interface screen for selecting sheet feeding cassettes of the sheet feeding unit 140 to perform the print position adjustment processing on. The print position adjustment screen 1200 includes buttons 1201 to 1207. On the print position adjustment screen 1200, sheet feeding cassettes of the sheet feeding unit 140 to perform the print position adjustment processing on is designatable. The buttons 1201 to 1205 displayed each correspond to the number of the corresponding cassette in the column 311 in the cassette list. The buttons selected by the operator are highlighted as indicated by the button 1203. The button 1206 is a back button for returning to the screen 300. The button 1207 is a button for designating all the cassettes as the print position adjustment target. In response to a press of the button 1207, all the sheet feeding cassettes of the buttons 1201 to 1205 are selected. A button 1208 is a button (start instruction button) for executing print position adjustment processing on the selected sheet feeding cassettes. In response to a press of the button 1208, the CPU 114 starts the print position adjustment processing to be described below.

<Print Position Adjustment Chart and Measurement Details>

Figure 6:
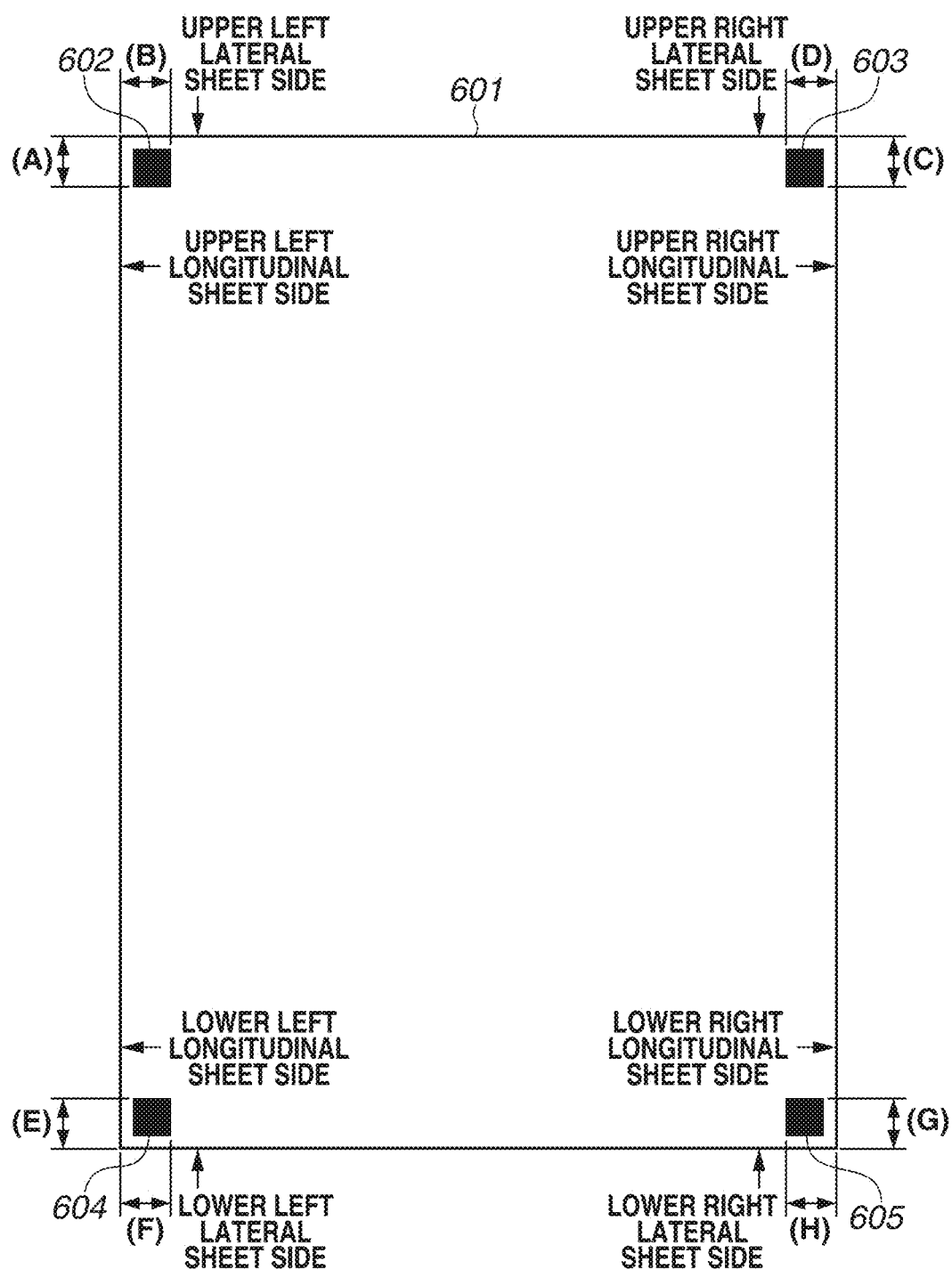
FIG. 6 illustrates a print position adjustment chart.

FIG. 6 schematically illustrates an example of the adjustment chart used in print position adjustment. In response to a press of the button 1208, the CPU instructs the image forming apparatus 100 to print the adjustment chart.

On the printed adjustment chart 601, marks 602 to 605 are printed at specific positions. The marks are printed at eight locations, specifically, at four corners on the front surface of the adjustment chart and at four corners on the back surface of the adjustment chart. If the marks are printed at ideal print positions, the images of the marks are printed at locations that each are a predetermined distance away from the corresponding corner of the four corners of the surface. The relative position of each mark from the corresponding corner of each surface on the adjustment chart is measured, indicating the misalignment amount of the print position.

In the present exemplary embodiment, distances indicated by (A) to (H) in FIG. 6 are measured. The distances (A) to (H) each are the distance from the corresponding mark of the marks 602 and 605 to the nearest sheet end. In the present exemplary embodiment, the distances (A) to (H) each are 10 mm as a standard.

<Operation of Print Position Measurement Unit>

Figure 8:
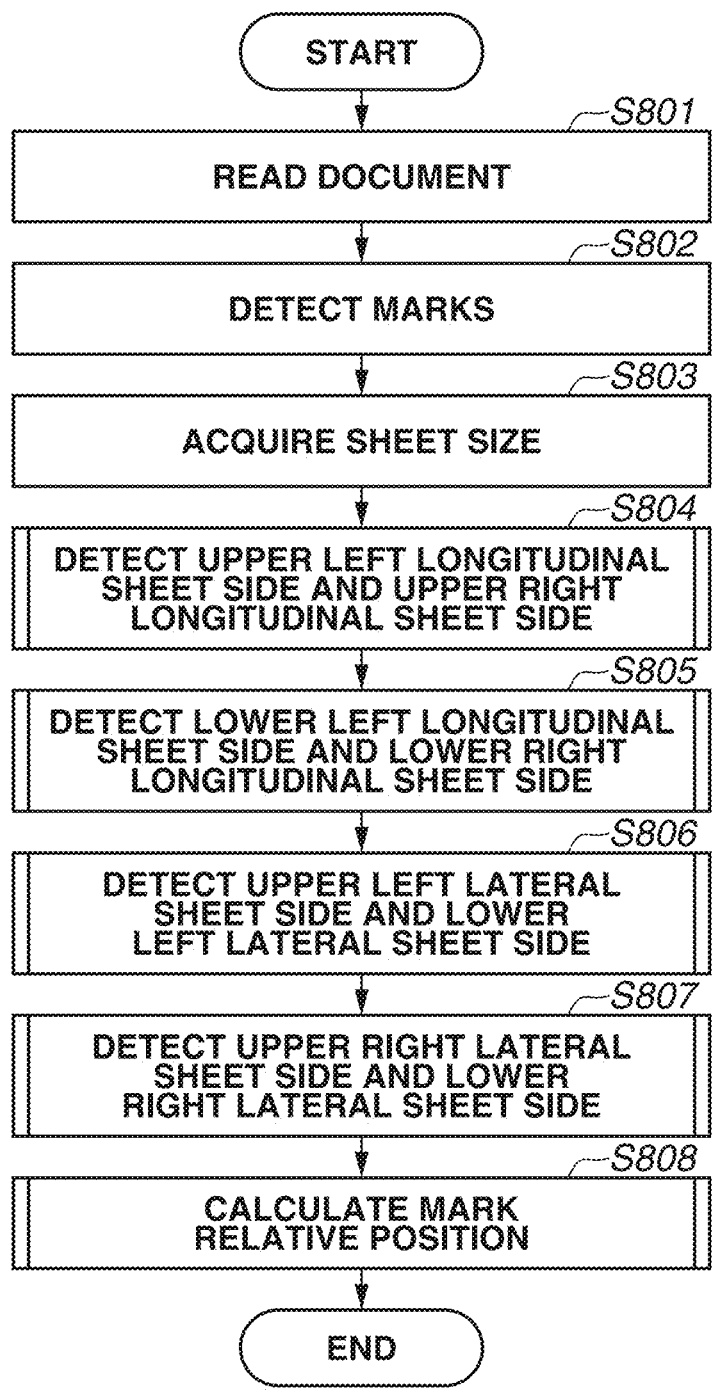
FIG. 8 is a flowchart illustrating mark relative position measurement processing.

A method of calculating the distances (A) to (H) will be described with reference to a flowchart illustrated in FIG. 8. A positional relationship between sheet sides (sheet ends) to be described in the flowchart is illustrated in the schematic diagram of FIG. 6.

In step S801, the CPU 114 acquires the read image of the adjustment chart through the image reading unit 130.

In step S802, the CPU 114 acquires the positions of the marks 602 to 605 from the read image. Each mark position is represented in two-dimensional coordinates of the horizontal direction (x) and the vertical direction (y) of the scanned image, and upper left coordinates are set as an origin (0, 0). In some embodiments, each mark position is represented in barycentric coordinates of the mark, and in other embodiments, each mark position is calculated with sub-pixel accuracy. In yet other embodiments, the mark detection processing is performed by a pattern matching method.

In step S803, the CPU 114 acquires the sheet size of the adjustment chart from the cassette library of FIG. 5. Specifically, the information in the column 513 indicating the sub-scanning direction sheet length (mm) and the information in the column 514 indicating the main scanning direction sheet length (mm) are acquired.

In step S804, the CPU 114 detects the upper left longitudinal sheet side and the upper right longitudinal sheet side.

The information about the sheet sides is used to calculate the distance (B) and the distance (D). This processing will be described in detail below.

In step S805, the CPU 114 detects the lower left longitudinal sheet side and the lower right longitudinal sheet side. The information about the sheet sides is used to calculate the distance (F) and the distance (H). The details of this processing are similar to those of step S804.

In step S806, the CPU 114 detects the upper left lateral sheet side and the lower left lateral sheet side. The information about the sheet sides is used to calculate the distance (A) and the distance (E). This processing will be described in detail.

In step S807, the CPU 114 detects the upper right lateral sheet side and the lower right lateral sheet side. Information about the sheet sides is used to calculate the distance (C) and the distance (G). The details of this processing are similar to those of step S806.

In step S808, the CPU 114 calculates the mark relative positions based on the eight detected sheet sides. In the processing, the normal line distance from marker central coordinates to a linear formula ($\rho = x \cos\theta + \sin\theta$) of each sheet side is calculated, finding the distances (A) to (H).

<Longitudinal Sheet Side Detection Processing>

Figure 10:
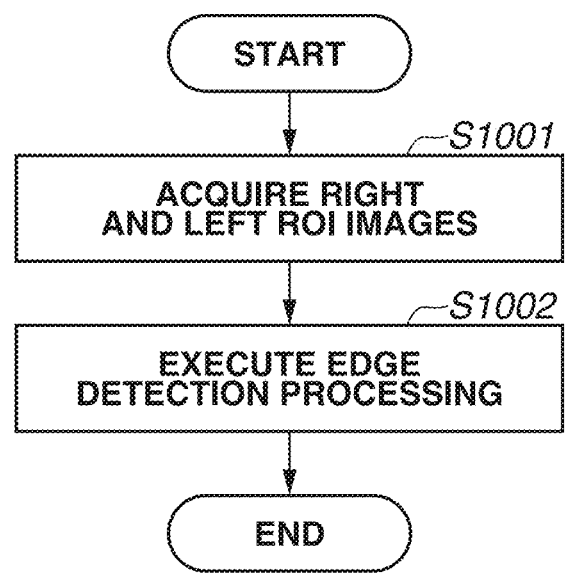
FIG. 10 is a flowchart illustrating longitudinal sheet side detection processing.

The longitudinal sheet side detection processing performed in steps S803 and S804 will be described in detail with reference to a flowchart illustrated in FIG. 10.

Figure 9:
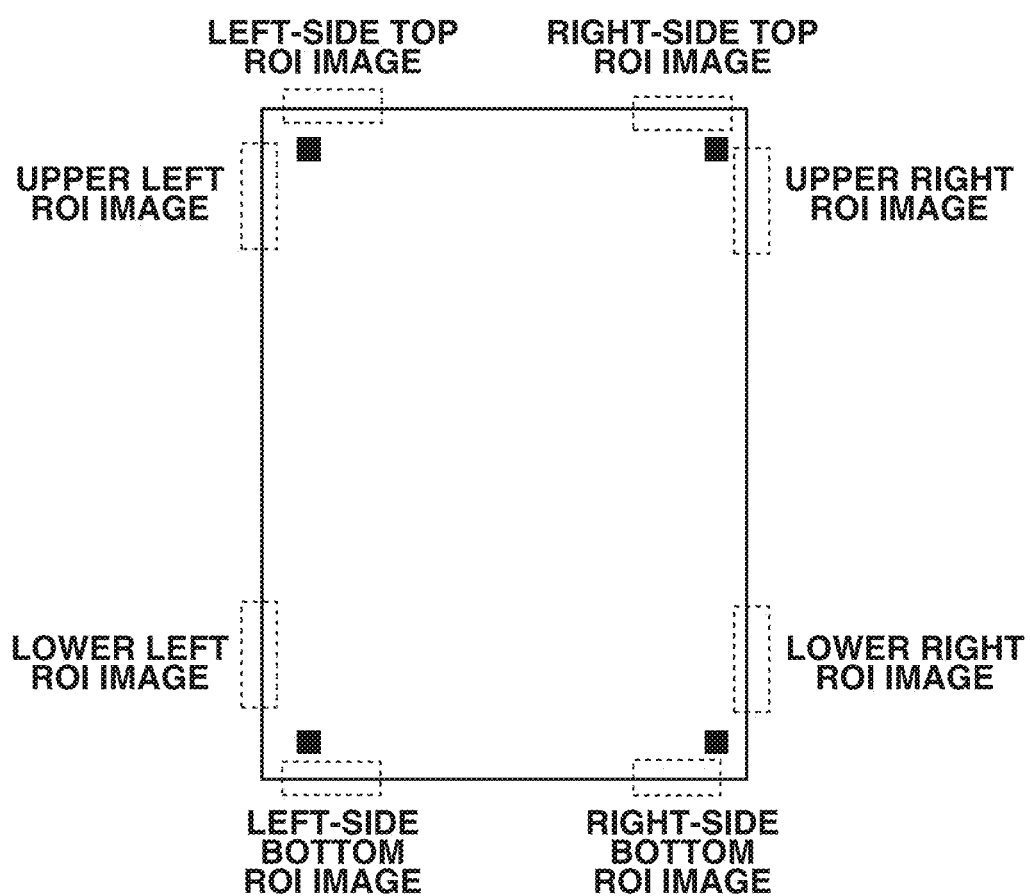
FIG. 9 illustrates a positional relationship between top, bottom, right, and left ROI images.

In step S1001, the CPU 114 acquires right and left Region Of Interest (ROI) images based on the mark positions acquired in step S802. FIG. 9 schematically illustrates a positional relationship between the left ROI image and the right ROI image to detect the upper left longitudinal sheet side and the upper right longitudinal sheet side. In the present exemplary embodiment, an area with a lateral length of 0.5 and a longitudinal length of 1.7 mm, the area of which has a center point at 1.0 mm left and 1.0 mm below each spaced from the center coordinates of the upper left mark, is extracted as the left ROI image. An area with a lateral length of 0.5 mm and a longitudinal length of 1.7 mm, the area of which has a center at 1.0 mm right and 1.0 mm below each spaced from the center coordinates of the upper right mark, is extracted as the right ROI image. Right and left ROI images used to extract the lower left longitudinal sheet side and the lower right longitudinal sheet side are acquired in the same manner as described above.

In step S1002, the CPU 114 applies an edge detection filter to the individual right and left ROI images acquired in step S1001. In the present exemplary embodiment, the following kernel k is employed as the edge detection filter.

$$k = \begin{bmatrix} -2 & -1 & 6 & -1 & -2 \\ -2 & -1 & 6 & -1 & -2 \\ -4 & -2 & 12 & -2 & -4 \\ -2 & -1 & 6 & -1 & -2 \\ -2 & -1 & 6 & -1 & -2 \end{bmatrix} \quad \text{Expression (1)}$$

The edge detection filter is not limited to the above-described kernel k. In some embodiments, a horizontal Laplacian filter or a differential filter is used. An image obtained through the edge detection filter is hereinafter described as Ie (x, y), where x and y represent coordinate indices.

<Lateral Sheet Side Detection Processing>

Figure 13:
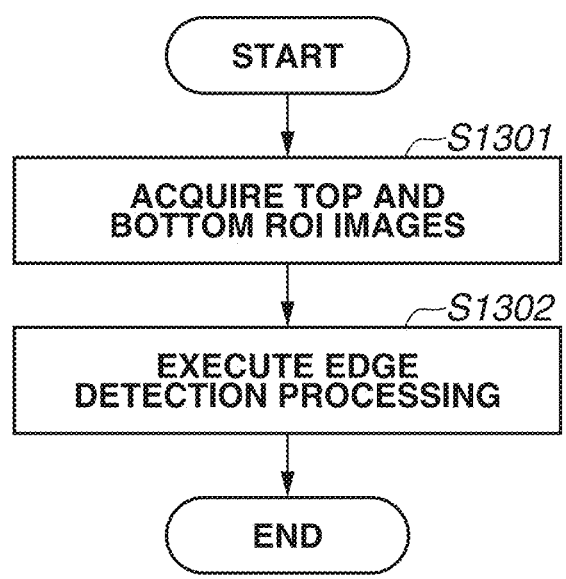
FIG. 13 is a flowchart illustrating lateral sheet side detection processing.

The lateral sheet side detection processing performed in steps S806 and S807 will be described in detail with reference to a flowchart illustrated in FIG. 13.

In step S1301, the CPU 114 acquires the top and bottom ROI images based on the mark positions acquired in step S802. FIG. 9 schematically illustrates a positional relationship between the top ROI image and the bottom ROI image to detect the upper left lateral sheet side and the lower left longitudinal sheet side. In the present exemplary embodiment, an area with a lateral length of 1.7 mm and a longitudinal length of 0.5 mm, the area of which has a center at 1.0 mm right and 1.0 mm above spaced from the center coordinates of the upper left mark, is extracted as the top ROI image. An area with a lateral length of 1.7 mm and a longitudinal length of 0.5 mm, the area of which has a center at 1.0 mm right and 1.0 mm below spaced from the center coordinates of the lower left mark, is extracted as the bottom ROI image. The top and bottom ROI images used to extract the upper right lateral sheet side and the lower right lateral sheet side are acquired in the same manner as described above.

In step S1302, the CPU 114 applies an edge detection filter to the individual top and bottom ROI images acquired in step S1301. In the present exemplary embodiment, a vertical differential filter is used as the edge detection filter. However, the edge detection filter is not limited to this. In one or more embodiments, any other filter such as a vertical Laplacian filter is used.

<Print Position Adjustment Processing Procedure>

The operator selects at least one sheet feeding cassette on the interface screen illustrated in FIG. 12A and presses the button 1208 to start print position adjustment processing. FIG. 11 is a flowchart illustrating an operation performed by the CPU 114 during the print position adjustment processing.

Figure 16A:
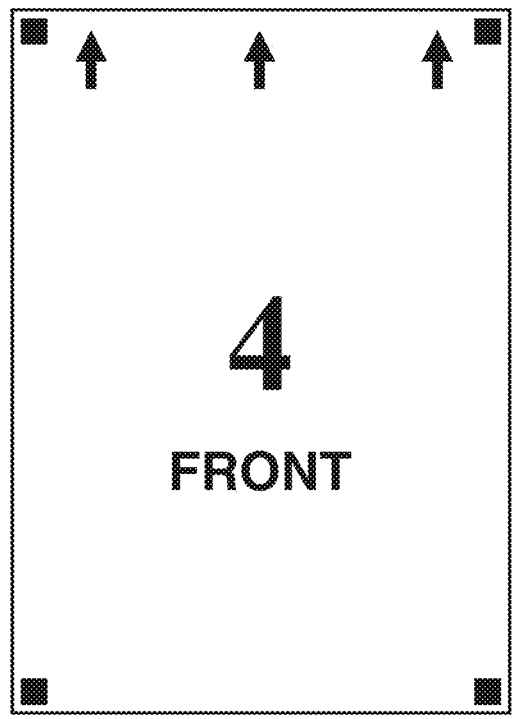
FIG. 16A illustrates the front surface of an adjustment chart.
Figure 16B:
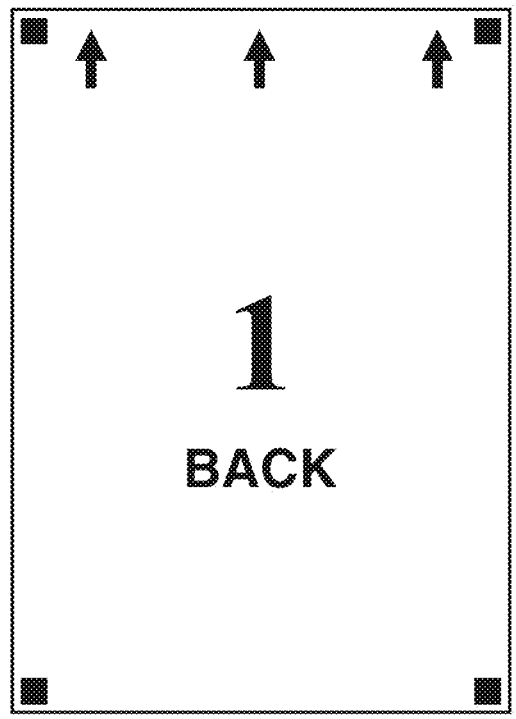
FIG. 16B illustrates the back surface of the adjustment chart.

In step S1101, the CPU 114 performs duplex printing of the adjustment chart illustrated in FIG. 6 using a sheet placed in the selected sheet feeding cassette of the sheet feeding unit 140 received in step S1101, and then the processing proceeds to step S1102. To identify the sheet feeding cassette feeding the adjustment chart to print and to identify the front surface or the back surface of the sheet, the sheet feeding cassette number (identification information), sheet orientation, and front or back are printed as illustrated in FIGS. 16A and 16B. FIG. 16A illustrates an example of the front surface of a sheet printed from the sheet feeding cassette 4. FIG. 16B illustrates an example of the back surface of the sheet printed from the sheet feeding cassette 1. Thus, the sheet feeding cassette number, sheet orientation, and front or back are identifiable. Information to be printed is not limited to characters, numbers, and marks. Any other printing methods, such as a barcode, may be used as long as the sheet feeding cassette feeding the adjustment chart to be printed and the front or back surface of the sheet are identifiable. In some embodiments, instead of using the cassette number, identification information for identifying the sheet type itself is added.

In step S1102, the CPU 114 causes the image reading unit 130 to scan both surfaces of the adjustment chart printed in step S1101, and then the processing proceeds to step S1103.

In step S1103, the CPU 114 reads the cassette number and the front or back surface of the adjustment chart based on image analysis of the image scanned in step S1102, and then the processing proceeds to step S1104.

In step S1104, the CPU 114 causes the print position measurement unit to calculate the values of the respective items of the print position misalignment amounts based on the image analysis of the scanned image determined to be the front surface in step S1103. The calculated values are stored in the print position misalignment amounts (front surface) 520 of the cassette library corresponding to the cassette number read in step S1103, and then the processing proceeds to step S1105.

In step S1105, the CPU 114 causes the print position measurement unit to calculate the values of the respective items of the print position misalignment amounts in the same manner as in step S1104 based on the image analysis of the scanned image determined to be the back surface in step S1103. The calculated values are stored in the print position misalignment amounts (back surface) 521 of the cassette library corresponding to the sheet feeding cassette number, and then the processing proceeds to step S1106.

In step S1106, if the CPU 114 determines that any other adjustment chart that has not been read (NO in step S1106) remains, the processing returns to step S1102 to read the next adjustment chart. If the reading of all the adjustment charts is completed (YES in step S1106), the processing is terminated.

<Usage Sequence>

Figure 7:
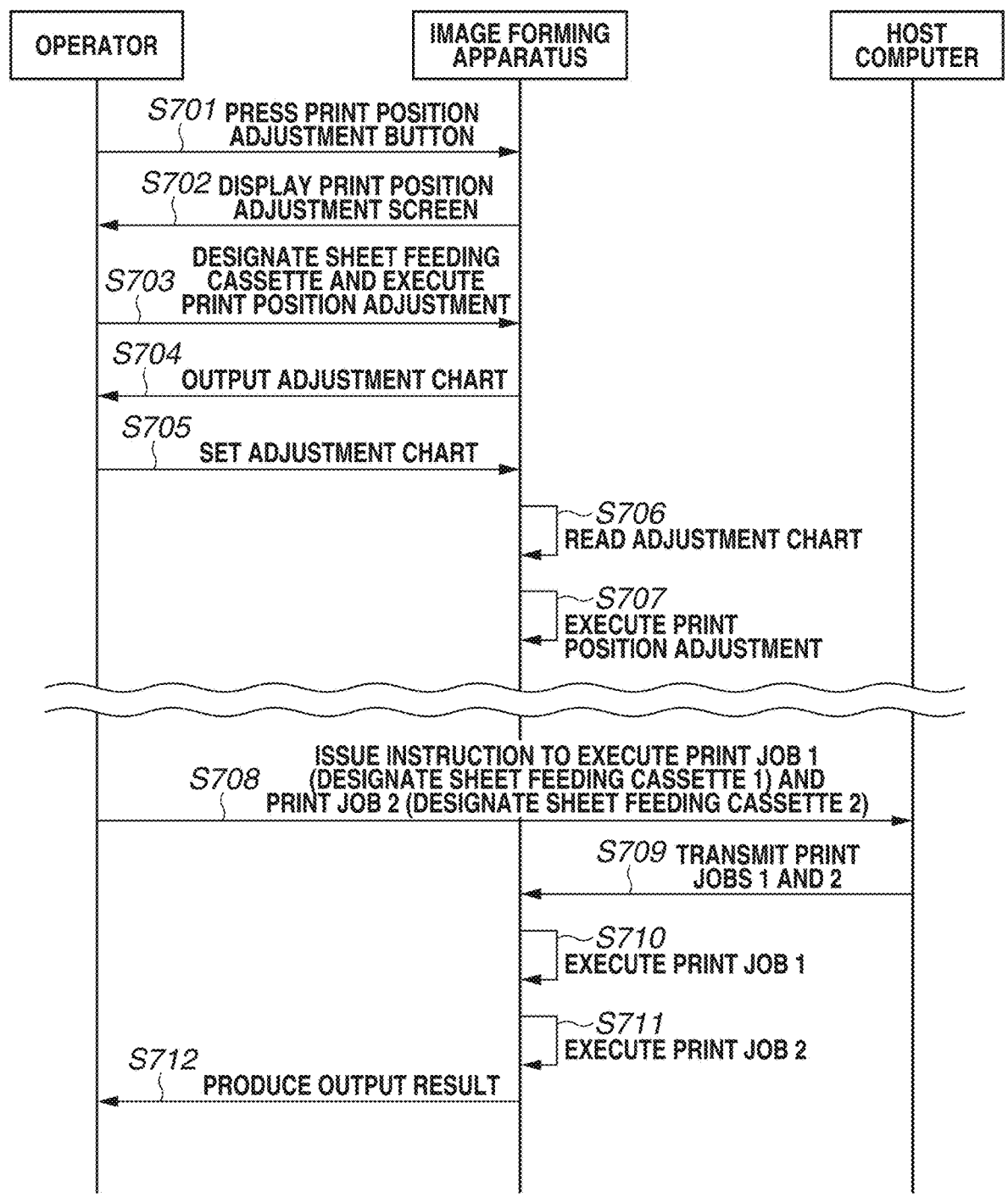
FIG. 7 is a sequence diagram illustrating a usage sequence according to a first exemplary embodiment.

FIG. 7 is a sequence diagram illustrating a series of processing according to the present exemplary embodiment. In the present exemplary embodiment, the main operation on the image forming apparatus 100 is performed by the operator. In this case, the processing is started in a state where the cassette library editing screen 300 is displayed.

First, in step S701, in response to a press of the print position adjustment button 321 by the operator, the image forming apparatus 100 determines to be instructed to start the print position adjustment. In step S702, the CPU 114 displays the print position adjustment screen 1200 on the image forming apparatus 100.

In step S703, the operator designates a sheet feeding cassette. In response to a press of the button 1208, the CPU 114 executes the print position adjustment processing on the image forming apparatus 100.

Figure 18:
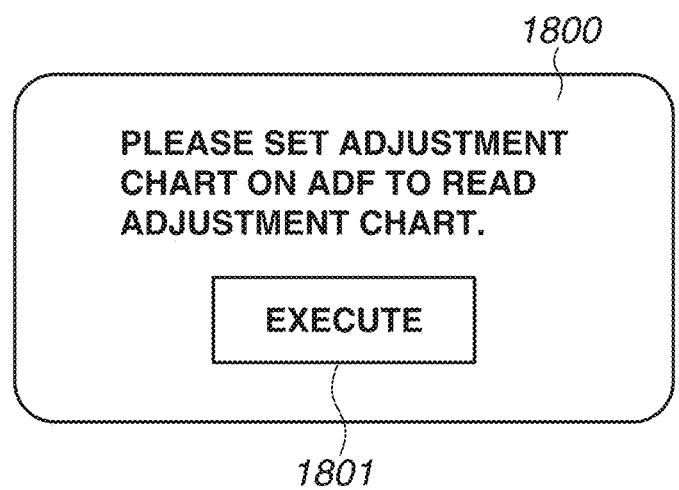
FIG. 18 illustrates an adjustment chart reading screen.

In step S704, the CPU 114 outputs the adjustment chart for executing the processing of step S1101 on the image forming apparatus 100. The output adjustment chart (output material) is placed on the sheet discharge unit 280. Then, the CPU 114 displays an adjustment chart reading screen 1800 on the image forming apparatus 100. FIG. 18 illustrates the adjustment chart reading screen 1800.

In step S705, the operator sets the adjustment chart output in step S704 on the document plate 230 (stacking portion) of the image reading unit 130. In response to a press of a button 1801, the processing proceeds to step S706.

In response to the press of the button 1801, in step S706, the CPU 114 causes the image reading unit 130 to read the adjustment chart set thereon in step S705 on the image forming apparatus 100, and then executes the processing in step S1102.

In step S707, the CPU 114 performs the print position adjustment and executes the print position adjustment processing in steps S1103 to S1106 on the image forming apparatus 100, thereby storing the print position misalignment amounts (parameters and adjustment values) for each selected sheet feeding cassette of the sheet feeding unit 140 in the cassette library.

In the present exemplary embodiment, the print position adjustment for each sheet feeding cassette is carried out as described above. Then, the following image formation is performed using the print position misalignment amounts registered for each sheet feeding stage.

In step S708, the operator instructs the host computer 101 to execute a print job 1 designating the sheet feeding cassette 1 and a print job 2 designating the sheet feeding cassette 2.

In step S709, the host computer 101 transmits the print job 1 and the print job 2 to the image forming apparatus 100.

In step S710, the image forming apparatus 100 executes the print job 1 using some sheets in the sheet feeding cassette 1. In this case, the print position misalignment amounts registered for the sheet feeding cassette 1 are read from the cassette library 500, and are used in the execution of the print job 1.

In step S711, the image forming apparatus 100 executes the print job 2 using some sheets in the sheet feeding cassette 2. In this case, the print position misalignment amounts registered for the sheet feeding cassette 2 are read from the cassette library 500, and are used in the execution of the print job 2.

In step S712, the image forming apparatus 100 produces the output results generated by executing the print job 1 and the print job 2.

The above-described processing enables the operator to calculate the print position misalignment amounts corresponding to the selected sheet feeding cassettes through a single scan on a plurality of sheet feeding cassettes, the print position misalignment amounts of which are then stored in the cassette library. Thus, this processing provides a reduced workload carried out by the operator, as well as a high-accuracy front and back print position adjustment.

Figure 12B:
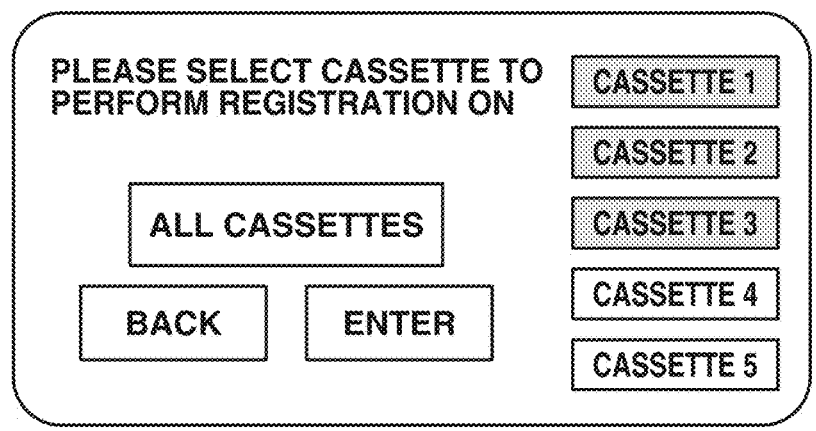

A second exemplary embodiment will be described. Although the first exemplary embodiment illustrates a method of collectively performing print position adjustment processing on a plurality of sheet feeding cassettes, the size of the sheets in one sheet feeding cassette may be different from the size of sheets in another sheet feeding cassette. FIG. 12B illustrates an example of the print position adjustment screen when the types of sheets illustrated in Table 1 are placed in the sheet feeding cassettes and the operator performs print position adjustment processing on a plurality of sheet feeding cassettes. In this case, printing operations from the sheet feeding cassettes 1, 2, and 3 are sequentially performed in print position adjustment processing execution. However, a set of printed adjustment charts consisting of some smaller sheets between larger sheets would make it awkward to carry to place on the image reading unit 130, causing deterioration in user-friendliness. Taking that into account, in the present exemplary embodiment, processing of changing a sequence to print from the selected sheet feeding cassettes is added.

TABLE 1

Sheet Examples in Sheet Feeding Cassettes

| Cassette Number | Sheet Name | Main Scanning Direction Sheet Length (mm) | Sub-scanning Direction Sheet Length (mm) |
|---|---|---|---|
| Cassette 1 | ABC Recycled Paper 2 | 297 | 420 |
| Cassette 2 | XYZ Coated Paper P-1 | 297 | 210 |
| Cassette 3 | ABC Recycled Paper 2 | 297 | 420 |

<Print Position Adjustment Processing Procedure in Second Exemplary Embodiment>

Figure 17:
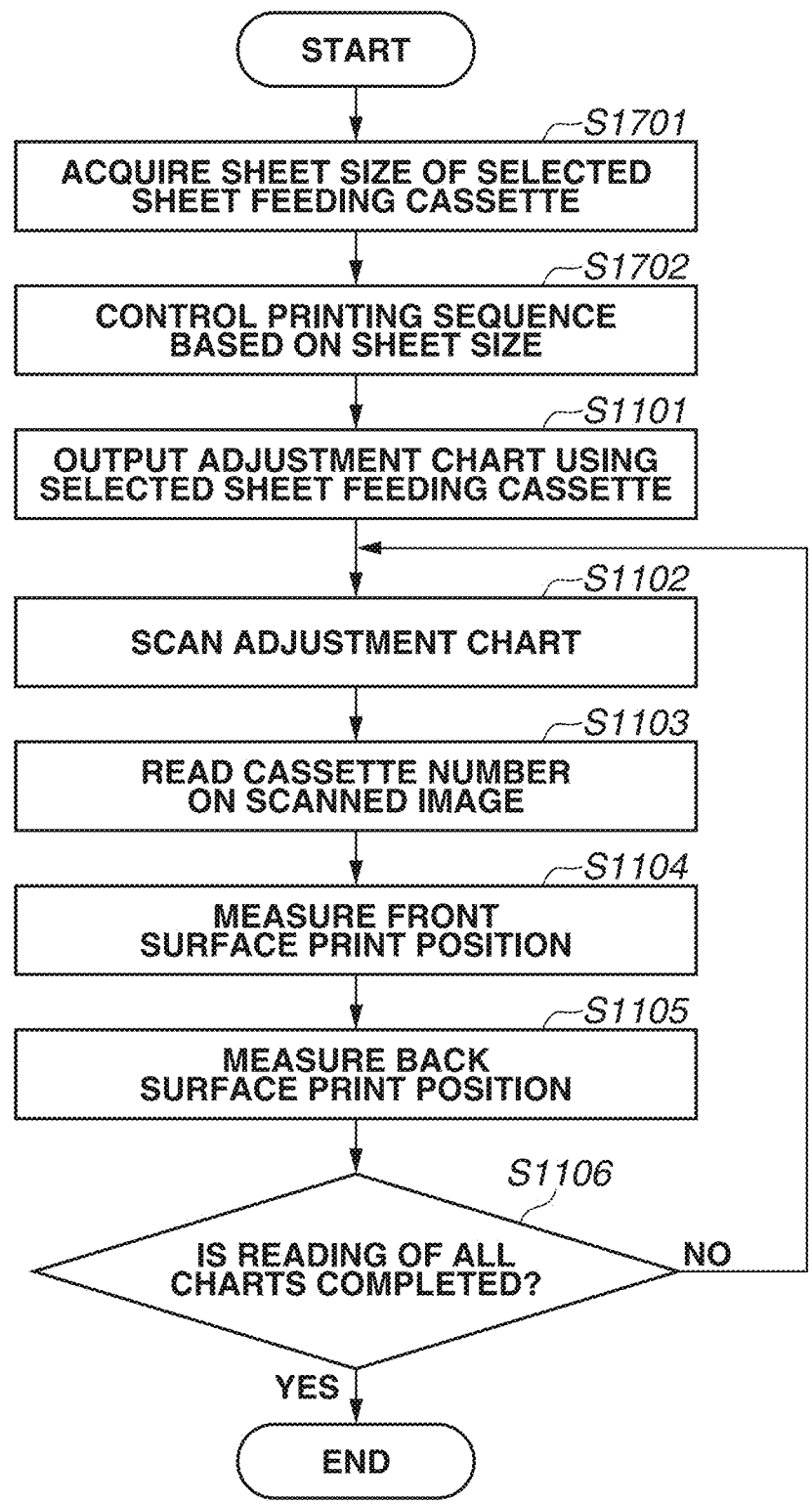
FIG. 17 is a flowchart illustrating print position adjustment processing according to a second exemplary embodiment.

FIG. 17 is a flowchart illustrating an operation performed by the CPU 114 during print position adjustment processing according to the present exemplary embodiment. The processing of steps S1102 to S1106 is similar to that of the first exemplary embodiment, and thus the redundant descriptions thereof will be omitted.

First, in step S1701, the CPU 114 acquires the sheet sizes of the sheet feeding cassettes selected on the print position adjustment screen 1200, which are subject to print adjustment processing. The information about the main scanning direction sheet lengths and the sub-scanning direction sheet lengths is acquired as sheet sizes from among the sheet attribute information corresponding to the sheet feeding cassettes via the cassette library stored in the HDD 115 or the like.

In step S1702, the CPU 114 determines a printing sequence based on the sheet sizes acquired in step S1701. The sheet feeding cassettes are sorted in descending order of the sub-scanning direction sheet lengths acquired in step S1701.

The sheet feeding cassettes may be sorted in descending order of the main scanning direction sheet lengths as the sheet feeding cassettes is sorted in descending order of sheet sizes. In the example illustrated in Table 1, the sub-scanning direction sheet length in the cassette 2 is shorter than those in the other cassettes, and thus printing is executed in the order of the cassettes 2, 1, and 3.

The sequence to print from the sheet feeding cassettes including sheets with the above sizes is not limited to this example. Printing may be executed in the order of the cassettes 2, 3, and 1 as the sheet feeding cassettes are sorted in descending order of sheet sizes.

In step S1101, the CPU 114 executes processing similar to that of the first exemplary embodiment based on the printing sequence determined in step S1702.

This processing allows the operator to easily carry the printed adjustment chart sheets to set them on the image reading unit 130, improving user-friendliness for the operator.

Figure 14:
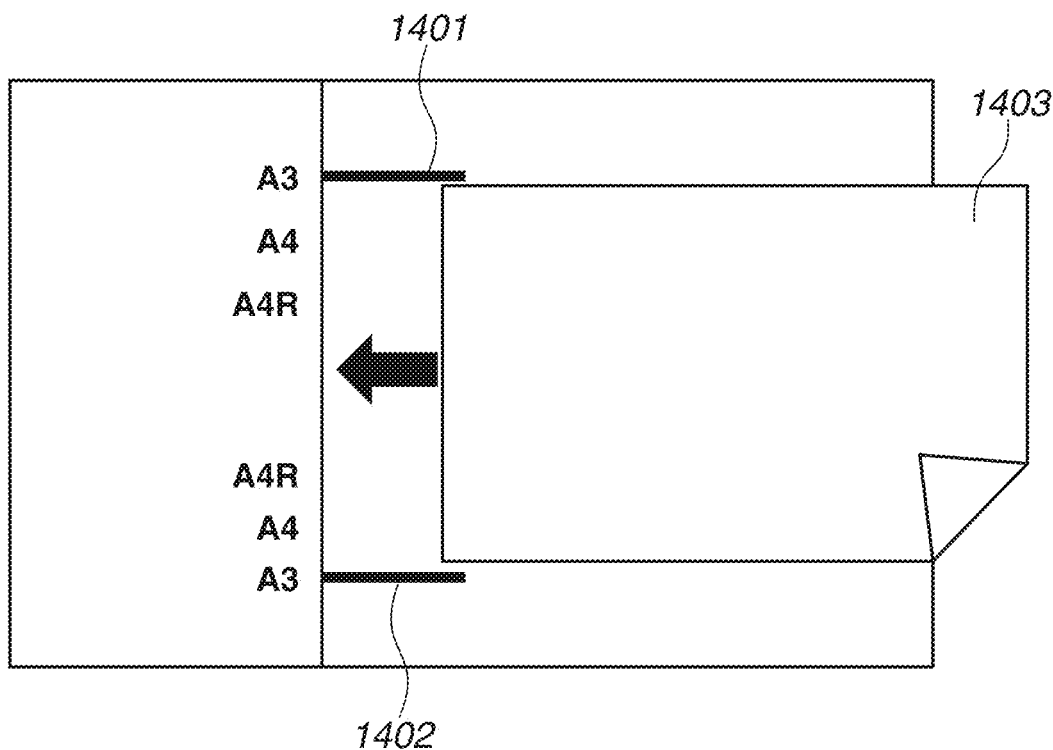
FIG. 14 illustrates scanner guides.
Figure 15:
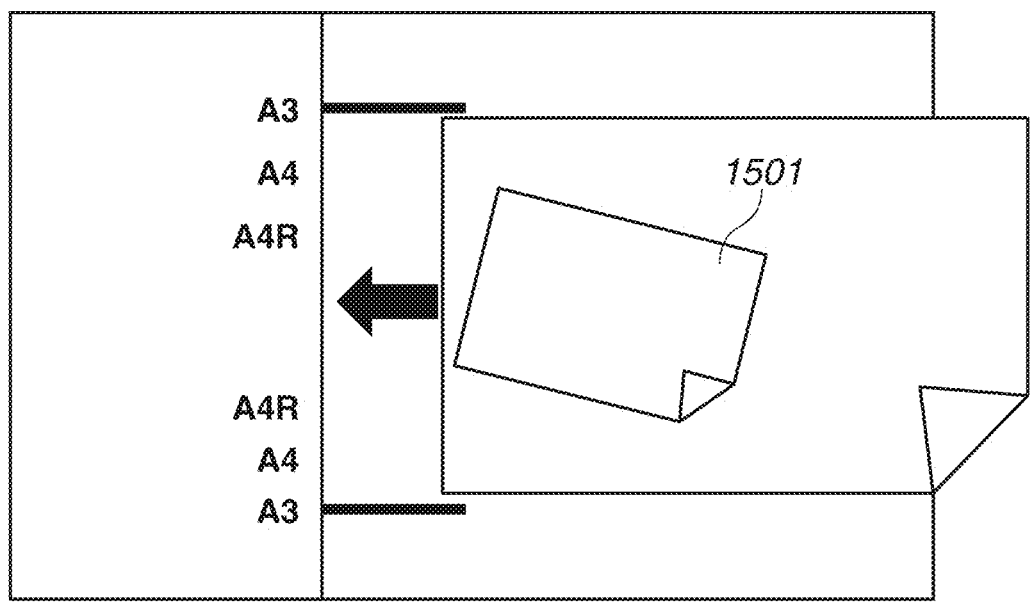
FIG. 15 illustrates a different-width mixture state.

A third exemplary embodiment will be described. Although the first exemplary embodiment illustrates a method of collectively performing print position adjustment processing on a plurality of sheet feeding cassettes, a sheet feeding cassette may include sheets with different sizes from one another in it. FIG. 12B illustrates an example where the operator performs print position adjustment processing on a plurality of sheet feeding cassettes. In this case, printing operations for the sheet feeding cassettes 1, 2, and 3 are sequentially performed in print position adjustment processing execution. On the other hand, the image reading unit 130 includes a mechanism for preventing skew during sheet conveyance. This mechanism is referred to as a guide. FIG. 14 illustrates an example of the guide. Guides 1401 and 1402 are designed to assist the linearity of sheet conveyance in conveyance of a sheet 1403. If printing on the sheets on the image reading unit 130 is executed based on the settings illustrated in FIG. 12B described above, some sheets, for example, as indicated by a sheet 1501 illustrated in FIG. 15 (this state is hereinafter referred to as a different-width mixture), do not receive assistance of linearity of sheet conveyance, causing skew during scanning, presenting print position adjustment processing with worse accuracy. To address this issue, the operator could select the same size sheets not to mix some sheet types of different size in the sheets and then execute print position adjustment processing multiple times, which is not user-friendly for the operator. Thus, in the present exemplary embodiment, processing of preventing different-width mixture is added.

<Print Position Adjustment>

The print position adjustment according to the present exemplary embodiment will be described with reference to FIG. 12A. The operations of the buttons 1206 to 1208 are similar to those of the first exemplary embodiment, and thus the redundant descriptions thereof will be omitted. The buttons 1201 to 1205 displayed each correspond to the corresponding sheet feeding cassette number in the column 311 in the cassette list. In the present exemplary embodiment, in response to a press of any of the buttons 1201 to 1205 by the operator, a different operation is performed. For example, in response to a press of the button 1201 by the operator with different types of sheet placed in the sheet feeding cassettes as shown in Table 1, the CPU 114 executes different-width mixture prevention processing, which will be described below. When the different-width mixture prevention processing is finished, the CPU 114 brings the button corresponding to the sheet feeding cassette including a different-width mixture among the buttons on the print position adjustment screen 1200 into being unselectable, which grays out the button as indicated by a button 1210. In other words, the designation of the button 1210 is disabled on this screen.

<Different-Width Mixture Prevention Processing>

Figure 21:
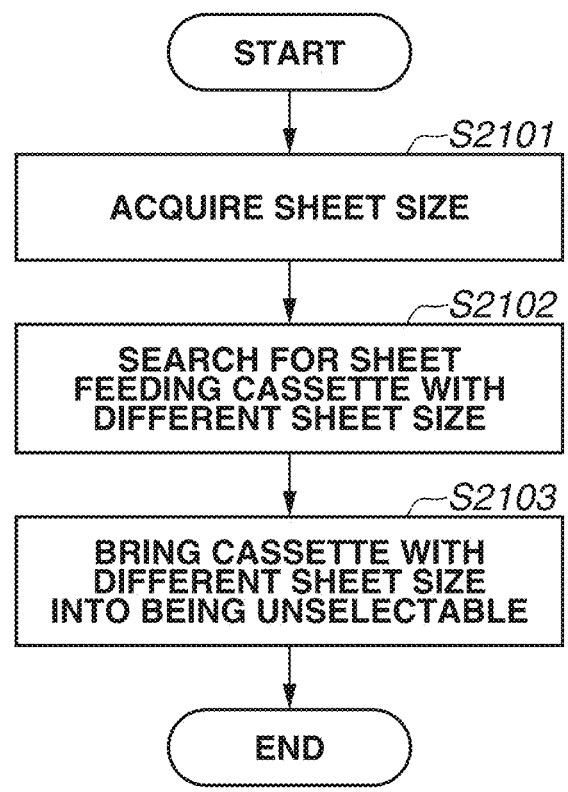
FIG. 21 is a flowchart illustrating print position adjustment processing according to the fourth exemplary embodiment.

FIG. 21 is a flowchart illustrating an operation performed by the CPU 114 during different-width mixture prevention processing according to the present exemplary embodiment.

In step S2101, the CPU 114 acquires the sheet sizes of the sheet feeding cassettes selectable on the print position adjustment screen 1200. The main scanning direction sheet lengths and the sub-scanning direction sheet lengths as the sheet sizes of the sheet feeding cassettes selectable are acquired from among the sheet attribute information on the sheet feeding cassettes via the cassette library stored in the HDD 115 or another memory. When a sheet feeding cassette is first selected on the print position adjustment screen 1200 after the print position adjustment screen 1200 is displayed, information about all the sheet feeding cassettes is acquired.

In step S2102, the CPU 114 searches for any other sheet feeding cassettes with the main scanning direction sheet length and the sub-scanning direction sheet length different from those selected on the print position adjustment screen 1200 acquired in step S2101. With a plurality of sheet feeding cassettes selected on the print position adjustment screen 1200, the sheet feeding cassettes with the main and sub-scanning direction sheet lengths different from those of the selected sheet feeding cassettes are searched for based on the same length among the individual main and sub-scanning direction sheet lengths. This processing will be described with reference to the example illustrated in FIG. 5. Assume that the cassette 1 and the cassette 2 are selected on the print position adjustment screen 1200. The main scanning direction sheet length of the sheet feeding cassette 1 is 297 (mm), which is the same length as that of the sub-scanning direction sheet length of the cassette 2. Likewise, the cassette 4 and the cassette 5 include 297 (mm); these are also selectable. The cassette 3 has main and sub-scanning direction sheet lengths different from the equal length.

In step S2103, the CPU 114 brings the cassette with different main and sub-scanning direction sheet lengths selected on the print position adjustment screen 1200 and found in step S2102 into being unselectable, and grays out the button of the cassette as indicated by the button 1210.

<Usage Sequence in Third Exemplary Embodiment>

Figure 20:
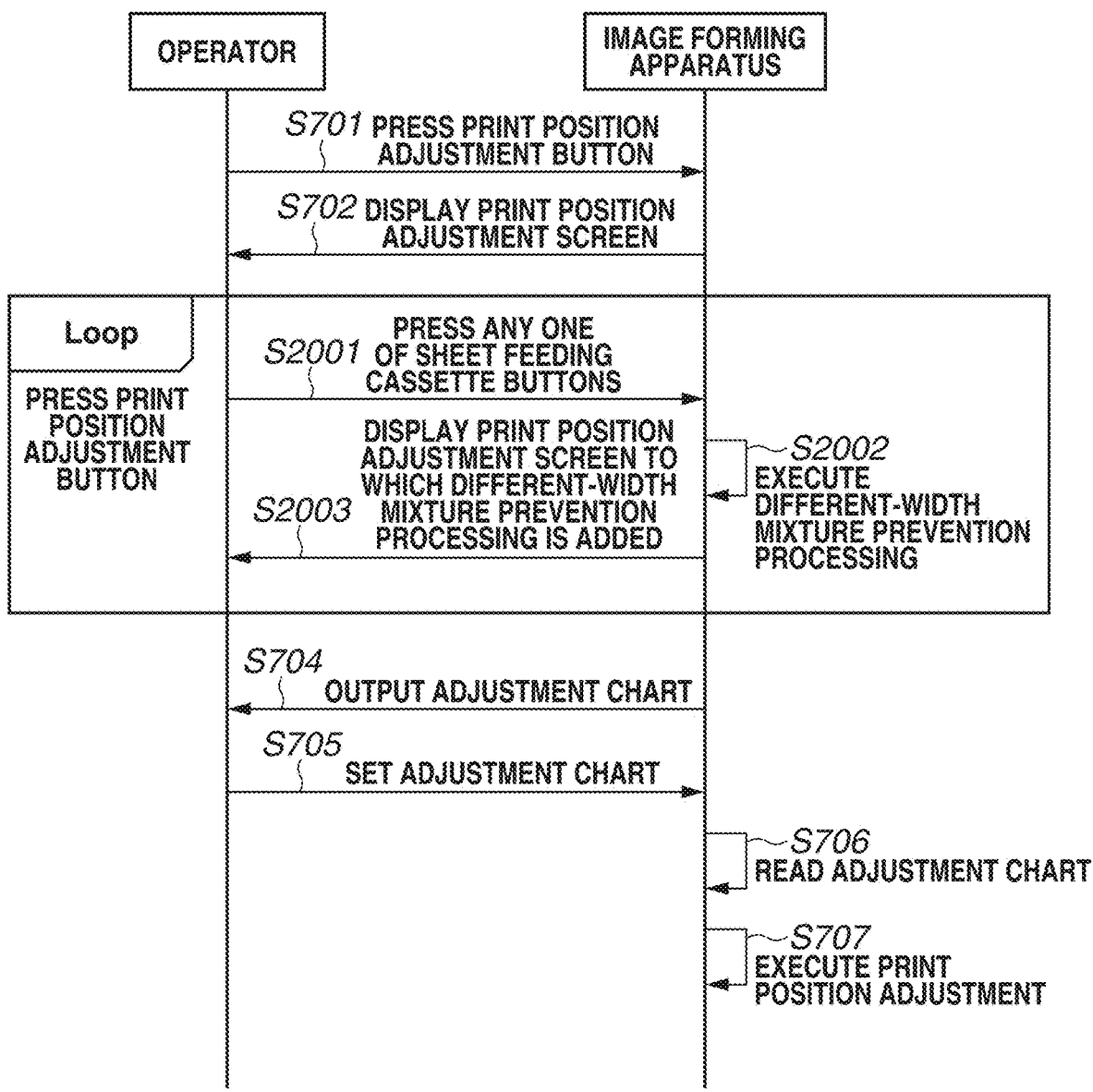
FIG. 20 is a sequence diagram illustrating a usage sequence according to a fourth exemplary embodiment.

FIG. 20 is a sequence diagram illustrating a series of processing according to the present exemplary embodiment. Steps S701 and S702 and steps S704 to S707 are similar to those of the first exemplary embodiment, and thus the redundant descriptions thereof will be omitted. In the present exemplary embodiment, the main operation on the image forming apparatus 100 is performed by the operator.

In step S2001, the operator presses any one of the sheet feeding cassette buttons 1201 to 1205 to select it.

In step S2002, the CPU 114 executes the different-width mixture prevention processing on the image forming apparatus 100.

This operation allows the operator to perform the print position adjustment processing with high accuracy without changing the print position adjustment method to prevent the different-width mixture, which leads to an improvement in user-friendliness for the operator.

Figure 12C:
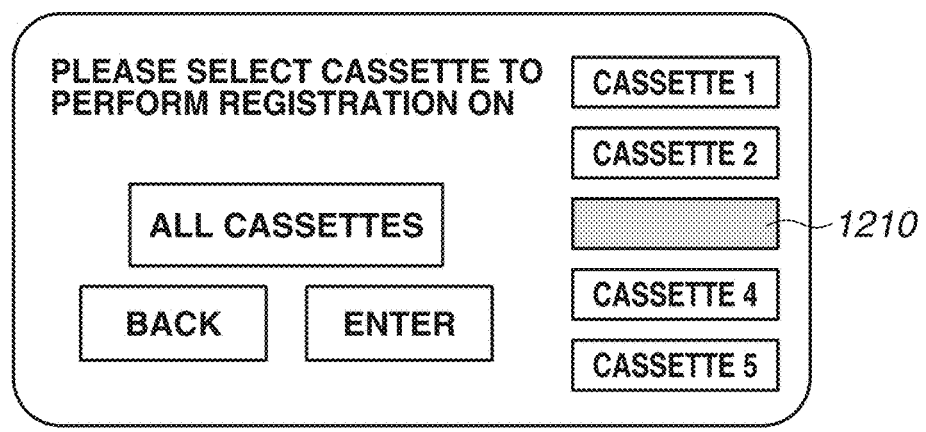

A fourth exemplary embodiment will be described. Although the third exemplary embodiment illustrates a method of preventing the different-width mixture, there are some cases of executing print position adjustment on the unselectable sheet feeding cassette grayed out in FIG. 12C, involving print position adjustment processing re-execution, which is not user-friendly for the operator. In the present exemplary embodiment, a method will be described of executing print position adjustment processing fewer times with high accuracy, which additionally involves processing of determining a print combination preventing different-width mixture in a plurality of sheet feeding cassettes selected by the operator on the print position adjustment screen 1200.

<Print Position Adjustment Processing Procedure in Fourth Exemplary Embodiment>

Figure 22:
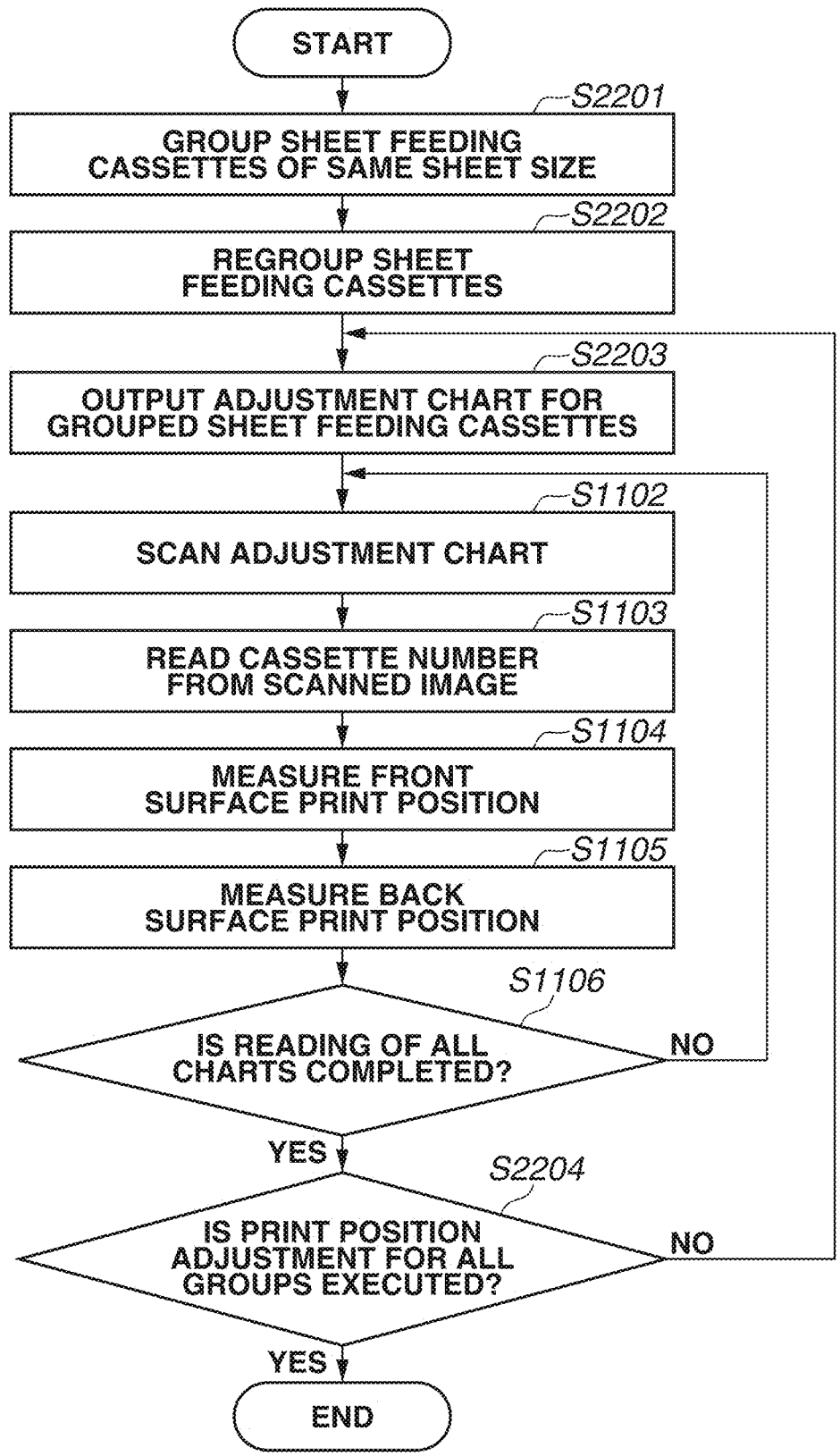
FIG. 22 is a flowchart illustrating different-width mixture handling processing according to the fourth exemplary embodiment.

FIG. 22 is a flowchart illustrating an operation performed by the CPU 114 during print position adjustment processing according to the present exemplary embodiment. The processing of steps S1102 to S1106 is similar to that of the first exemplary embodiment, and thus the redundant descriptions thereof will be omitted.

In step S2201, the CPU 114 groups the sheet feeding cassettes of a sheet size (sheets with the same size) from among the sheet feeding cassettes selected on the print position adjustment screen 1200. Groups of the same sheet size means a group of an equal sheet length in the main scanning direction and an equal sheet length in the sub-scanning direction of sheet feeding cassettes, and a group of sheet feeding cassettes of which an equal sheet length in the main scanning direction of some sheet feeding cassettes is the same as an equal sheet length in the sub-scanning direction of the other sheet feeding cassettes, and vice versa. This is because the sheets set in each sheet feeding cassette are oriented in the portrait or landscape direction. An example with all sheet feeding cassettes selected will be described with reference to FIG. 3. The sheet size of the cassette 1 and the sheet size of the cassette 4 are equal in sheet size and orientation, and thus the cassette 1 and the cassette 4 are treated as a group (hereinafter referred to as "group A"). Further, the sheet feeding cassettes including the sheets with the same size as that of the group A but the other orientation, which means that the sheet length in the main scanning direction of the group A is equal to that in the sub-scanning direction of the sheet feeding cassettes, and vice versa, are added to the group. The group A and the cassette 5 have different sheet orientations to each other but the same sheet size, and thus the group A and the cassette 5 are treated as a group (hereinafter referred to as "group A'").

The cassette 2 and the cassette 3 have different sheet sizes, and the cassette 2 and the cassette 3 are treated as groups B and C, respectively. Grouping results are listed in Table 2.

TABLE 2

| Grouping Results in Step S2201 | | | |
|---|---|---|---|
| | Sub-scanning Direction Sheet Length (mm) | Main Scanning Direction Sheet Length (mm) | Group |
| Cassette 1 | 210 | 297 | A' |
| Cassette 2 | 297 | 420 | B |
| Cassette 3 | 216 | 279 | C |
| Cassette 4 | 210 | 297 | A' |
| Cassette 5 | 297 | 210 | A' |

In step S2202, the CPU 114 further groups sheet feeding cassettes grouped in step S2201 that have the same sheet length in either the main scanning direction or the sub-scanning direction (having an equal side length). The cassette 2 has a length of 297 (mm) in the sub-scanning direction, which is equal to the length in the main scanning direction of the group A' created in step S2201, and thus the cassette 2 is newly grouped into a group A' and B. On the other hand, the cassette 3 has no sheet length in the main or sub-scanning direction equal to any sheet length of the other groups. As a result, the cassette 3 remains as the group C. Grouping results are illustrated in Table 3.

TABLE 3

| Grouping Results in Step S2202 | | | | |
|---|---|---|---|---|
| | Sub-scanning Direction Sheet Length (mm) | Main Scanning Direction Sheet Length (mm) | Group | |
| Cassette 1 | 210 | 297 | A' | B |
| Cassette 2 | 297 | 420 | A' | B |
| Cassette 3 | 216 | 279 | C | |
| Cassette 4 | 210 | 297 | A' | B |
| Cassette 5 | 297 | 210 | A' | B |

In step S2203, the CPU 114 prints the adjustment chart for each group of sheet feeding cassettes grouped in step S2202. First, printing for the group A' and B is executed, and then the processing proceeds to step S1102. When the processing of step S2203 is executed again, the CPU 114 executes printing for the remaining group C, and then the processing proceeds to step S1102.

In step S2204, the CPU 114 determines whether the print position adjustment processing is executed on all the groups. If the print position adjustment processing is executed on all the groups obtained in step S2202 (YES in step S2204), the processing is terminated. Otherwise (NO in step S2204), the processing returns to step S2203 to execute the print position adjustment processing on the remaining groups.

<Usage Sequence in Fourth Exemplary Embodiment>

Figure 19:
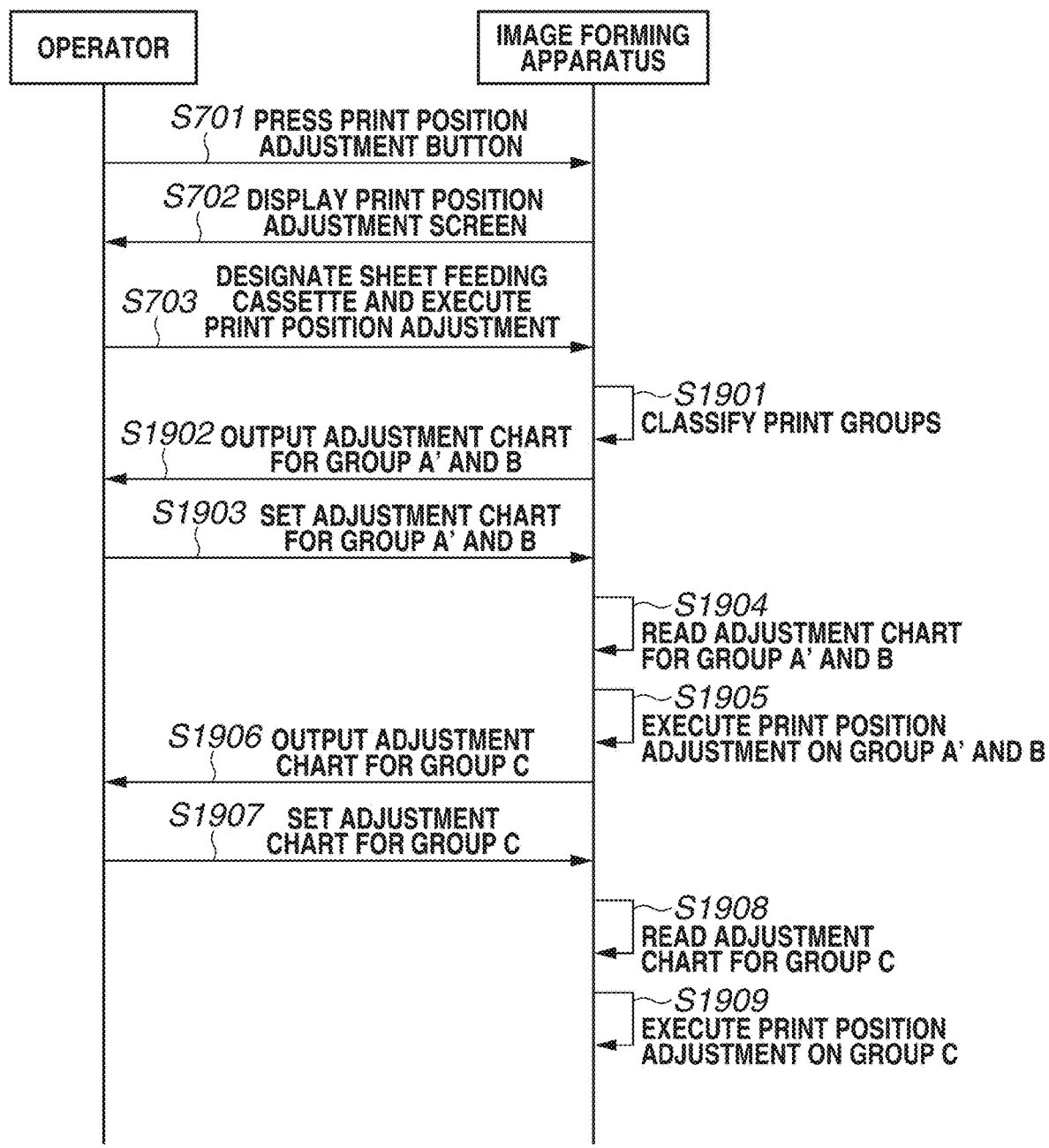
FIG. 19 is a sequence diagram illustrating a usage sequence according to a third exemplary embodiment.

FIG. 19 is a sequence diagram illustrating a series of processing according to the present exemplary embodiment. The processing of steps S701 to S703 is similar to that of the first exemplary embodiment, and thus the redundant descriptions thereof will be omitted. In the present exemplary embodiment, the main operation on the image forming apparatus 100 is performed by the operator. An example with all the sheet feeding cassettes selected on the cassette library editing screen 300 displayed in FIG. 3 will be described.

First, in step S1901, the CPU 114 executes the processing in steps S2201 and S2202 on the image forming apparatus 100, thereby classifying the sheet feeding cassettes into print groups with no different-width mixture.

In step S1902, the CPU 114 executes the processing in step S2203 to output the adjustment chart for each group of the sheet feeding cassettes on the image forming apparatus 100. First, the adjustment chart for the group A' and B is output. Then, the CPU 114 displays the adjustment chart reading screen 1800 on the image forming apparatus 100.

In step S1903, the operator places the adjustment chart for the group A' and B on the image reading unit 130. In response to a press of the button 1801, the processing proceeds to step S1904.

Next, in response to a press of the button 1801 by the operator, in steps S1904 and S1905, the CPU 114 performs the print position adjustment processing on the group A' and B in steps S1102 to S1106 and step S2204. If the print position adjustment processing on all the groups is not completed, the processing returns to step S1906.

In step S1906, the CPU 114 outputs the adjustment chart for the group C on the image forming apparatus 100 in step S2203. In short, after outputting the adjustment chart for the group A' and B, the CPU 114 outputs the adjustment chart for the group C. Then, the CPU 114 displays the adjustment chart reading screen 1800 on the image forming apparatus 100.

In step S1907, the operator places the adjustment chart for the group C on the image reading unit 130. In response to a press of the button 1801, the processing proceeds to step S1909.

Next, in response to a press of the button 1801 by the operator, in steps S1908 and S1909, the CPU 114 executes the print position adjustment processing on the group A' and B in steps S1102 to S1106 and step S2204 on the image forming apparatus 100. Then, when it is determined that the print position adjustment processing on all the groups is completed, the processing is terminated.

Thus, the above-described configuration provides a highly accurate print position adjustment with high efficiency through one selection of sheet feeding cassettes by an operator, reducing the number of times of print position adjustment processing, enhancing user friendliness for the operator.

Other Exemplary Embodiments

The present disclosure can also be implemented by processing in which a program for implementing one or more functions according to the exemplary embodiments described above is supplied to a system or an apparatus via a network or a storage medium, and one or more processors in a computer of the system or the apparatus read out and execute the program. The present disclosure can also be implemented by a circuit (e.g., an application specific integrated circuit (ASIC) for implementing one or more functions according to the exemplary embodiments described above.

The present disclosure may be applied to a system composed of a plurality of devices, or may be applied to an apparatus composed of a single device. For example, an apparatus including the image reading unit 130 and an apparatus including the image forming unit 150 may be provided as separate apparatuses to operate in a cooperative manner in communication with each other. Further, an apparatus configured to perform image formation and an apparatus configured to perform image processing may be provided as separate apparatuses to operate in a cooperative manner in communication with each other.

The present disclosure is not limited to the above-described exemplary embodiments. The present disclosure can be modified in various ways (including organic combinations of exemplary embodiments) based on the scope of the present disclosure, and such modifications are not excluded from the scope of the present disclosure. In other words, all the configurations obtained by combining the above-described exemplary embodiments and modified examples of the exemplary embodiments are included in the present disclosure.

Definitions of abbreviations used in the exemplary embodiments are as follows.

ADF is an abbreviation for Auto Document Feeder.

ASIC is an abbreviation for Application Specific Integrated Circuit.

CIS is an abbreviation for Contact Image Sensor.

CNN is an abbreviation for Convolutional Neural Network. CPU is an abbreviation for Central Processing Unit.

CSV is an abbreviation for Comma-Separated Values.

FAX is an abbreviation for facsimile.

RAM is an abbreviation for Random-Access Memory.

ROI is an abbreviation for Region Of Interest.

ROM is an abbreviation for Read-Only Memory.

HDD is an abbreviation for Hard Disk Drive.

DPI is an abbreviation for Dots Per Inch.

XML is an abbreviation for Extensible Markup Language.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-119402, filed Jul. 10, 2020, which is hereby incorporated by reference herein in its entirety.

What is claimed is:

1. An image forming apparatus comprising:
an image forming device configured to form an image on a sheet;
an image reading device configured to convey a document placed on a stacking portion and read an image on the document; and
one or more controllers configured to perform operations including:
causing the image forming device to execute output processing to output a first output material and a second output material in succession, wherein the first output material constitutes a sheet of a first type on which an image of a predetermined pattern is formed, and the second output material constitutes a sheet of a second type on which the image of the predetermined pattern is formed,
causing the image reading device to execute reading processing of conveying the first output material and the second output material in succession from the stacking portion and reading a first image and a second image, and
acquiring a first parameter based on the first image and a second parameter based on the second image,
wherein the first parameter is a parameter for use in causing the image forming device to execute image formation using the sheet of the first type, and the second parameter is a parameter for use in causing the image forming device to execute image formation using the sheet of the second type.

2. The image forming apparatus according to claim 1, wherein the one or more controllers further perform operations including causing the image forming device to form an image whose position on the sheet of the first type is adjusted based on the first parameter and to form an image whose position on the sheet of the second type is adjusted based on the second parameter.

3. The image forming apparatus according to claim 1, wherein acquiring includes acquiring the first parameter based on at least a positional relationship between a sheet end of the first output material and a mark formed on the first output material.

4. The image forming apparatus according to claim 1, wherein the one or more controllers further perform operations including forming identification information corresponding to the sheet of the first type on the first output material, and forming identification information corresponding to the sheet of the second type on the second output material.

5. The image forming apparatus according to claim 1, wherein the one or more controllers further perform operations including forming, on the first output material, identification information corresponding to a first sheet storage unit configured to store the sheet of the first type, and forming, on the second output material, identification information corresponding to a second sheet storage unit configured to store the sheet of the second type.

6. The image forming apparatus according to claim 1, wherein the sheet of the first type and the sheet of the second type are sheets having the same size.

7. The image forming apparatus according to claim 1, wherein the sheet of the first type and the sheet of the second type are sheets having different sizes with an equal side length.

8. The image forming apparatus according to claim 1, further comprising a display device configured to display information,
wherein the one or more controllers further perform operations including:
causing the display device to display a first screen configured to issue an instruction to start the output processing, and
causing the display device to display a second screen configured to issue an instruction to start the reading processing.

9. The image forming apparatus according to claim 8, wherein the first screen is a screen configured to designate a plurality of sheet storage units on which the output processing is performed, including a first sheet storage unit, a second sheet storage unit, and a third sheet storage unit.

10. The image forming apparatus according to claim 8, wherein the first screen is a screen configured to disable designation of the third sheet storage unit in a state where the first sheet storage unit is designated.

11. The image forming apparatus according to claim 10, wherein the one or more controllers further perform operations including causing the image forming device to output a third output material having the image of the predetermined pattern formed on a sheet of a third type after the reading processing is executed, based on designation of the third sheet storage unit as well as the first sheet storage unit and the second sheet storage unit on the first screen.

12. A method for an image forming apparatus having an image forming device configured to form an image on a sheet and an image reading device configured to convey a document placed on a stacking portion and read an image on the document, the method comprising:
causing the image forming device to execute output processing to output a first output material and a second output material in succession, wherein the first output material constitutes a sheet of a first type on which an image of a predetermined pattern is formed, and the second output material constitutes a sheet of a second type on which the image of the predetermined pattern is formed;
causing the image reading device to execute reading processing of conveying the first output material and the second output material in succession from the stacking portion and reading a first image and a second image; and
acquiring a first parameter based on the first image and a second parameter based on the second image,
wherein the first parameter is a parameter for use in causing the image forming device to execute image formation using the sheet of the first type, and the second parameter is a parameter for use in causing the image forming device to execute image formation using the sheet of the second type.

13. A non-transitory storage medium storing a program to cause a computer to execute a method for an image forming apparatus having an image forming device configured to form an image on a sheet and an image reading device configured to convey a document placed on a stacking portion and read an image on the document, the method comprising:
causing the image forming device to execute output processing to output a first output material and a second output material in succession, wherein the first output material constitutes a sheet of a first type on which an image of a predetermined pattern is formed, and the second output material constitutes a sheet of a second type on which the image of the predetermined pattern is formed;

causing the image reading device to execute reading processing of conveying the first output material and the second output material in succession from the stacking portion and reading a first image and a second image; and acquiring a first parameter based on the first image and a second parameter based on the second image, wherein the first parameter is a parameter for use in causing the image forming device to execute image formation using the sheet of the first type, and the second parameter is a parameter for use in causing the image forming device to execute image formation using the sheet of the second type.

\* \* \* \* \*